US009569823B2

(12) United States Patent
Sutou et al.

(10) Patent No.: US 9,569,823 B2
(45) Date of Patent: Feb. 14, 2017

(54) IMAGE PROCESSING DEVICE AND METHOD, AND PROGRAM FOR CORRECTING A BLURRED MOVING IMAGE

(71) Applicant: SONY CORPORATION, Tokyo (JP)

(72) Inventors: Yasuhiro Sutou, Tokyo (JP); Hideki Shimomura, Kanagawa (JP); Atsushi Okubo, Tokyo (JP); Kazumi Aoyama, Saitama (JP); Akichika Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/652,546

(22) PCT Filed: Dec. 12, 2013

(86) PCT No.: PCT/JP2013/083296
§ 371 (c)(1),
(2) Date: Jun. 16, 2015

(87) PCT Pub. No.: WO2014/103731
PCT Pub. Date: Jul. 3, 2014

(65) Prior Publication Data
US 2015/0348243 A1 Dec. 3, 2015

(30) Foreign Application Priority Data

Dec. 26, 2012 (JP) .................................. 2012-282611

(51) Int. Cl.
*H04N 5/228* (2006.01)
*G06T 5/00* (2006.01)
(Continued)

(52) U.S. Cl.
CPC ............. *G06T 5/003* (2013.01); *G02B 27/017* (2013.01); *G06T 7/0085* (2013.01);
(Continued)

(58) Field of Classification Search
CPC ............ H04N 5/23248; H04N 5/23251; H04N 5/23258; H04N 5/23238; H04N 5/144; H04N 5/145
(Continued)

(56) References Cited

U.S. PATENT DOCUMENTS

2011/0292234 A1* 12/2011 Mitsumoto .......... H04N 5/2621
348/222.1
2011/0304687 A1* 12/2011 Joshi ................... H04N 5/23238
348/36
(Continued)

FOREIGN PATENT DOCUMENTS

| JP | 2010-147637 | 7/2010 |
|---|---|---|
| JP | 2011-217317 | 10/2011 |
| WO | WO2009/001510 | 12/2008 |

*Primary Examiner* — Kelly L Jerabek
(74) *Attorney, Agent, or Firm* — Paratus Law Group, PLLC

(57) ABSTRACT

Provided is an image processing device including an acquisition unit configured to acquire information on an imaging position and an imaging direction in units of frame images that constitute a moving image obtained through capturing by an imaging unit, a converted image generation unit configured to generate converted images having different imaging directions for each frame image that constitutes the moving image based on the frame image itself and preceding and succeeding frame images of the frame image, an evaluation value calculation unit configured to calculate an evaluation value for each converted moving image constituted by combining the converted image and the original frame image, the evaluation value being used to evaluate a blur between the converted images or between the original frame images, and a selection unit configured to select a converted moving image with less blur based on an evaluation value calculated by the evaluation value calculation unit.

11 Claims, 17 Drawing Sheets

(51) Int. Cl.
*G06T 7/00* (2006.01)
*G06T 7/20* (2006.01)
*G02B 27/01* (2006.01)
*H04N 5/225* (2006.01)
*H04N 5/232* (2006.01)
G03B 17/48 (2006.01)
G02C 11/00 (2006.01)
G06F 17/30 (2006.01)

(52) U.S. Cl.
CPC ......... *G06T 7/2006* (2013.01); *H04N 5/2251* (2013.01); *H04N 5/232* (2013.01); *H04N 5/23258* (2013.01); *H04N 5/23264* (2013.01); G02B 2027/0138 (2013.01); G02B 2027/0178 (2013.01); G02B 2027/0187 (2013.01); G02C 11/10 (2013.01); G03B 17/48 (2013.01); G03B 2217/005 (2013.01); G06F 17/30817 (2013.01); G06T 2207/10016 (2013.01); G06T 2207/20012 (2013.01); G06T 2210/61 (2013.01)

(58) Field of Classification Search
USPC ...... 348/208.99, 208.1–208.4, 208.13, 218.1
See application file for complete search history.

(56) References Cited

U.S. PATENT DOCUMENTS

| | | | |
|---|---|---|---|
| 2012/0069204 A1* | 3/2012 | Shimizu | H04N 5/23277 348/208.4 |
| 2013/0182177 A1* | 7/2013 | Furlan | H04N 19/51 348/362 |
| 2016/0071248 A1* | 3/2016 | Furlan | G06T 5/002 348/239 |

* cited by examiner

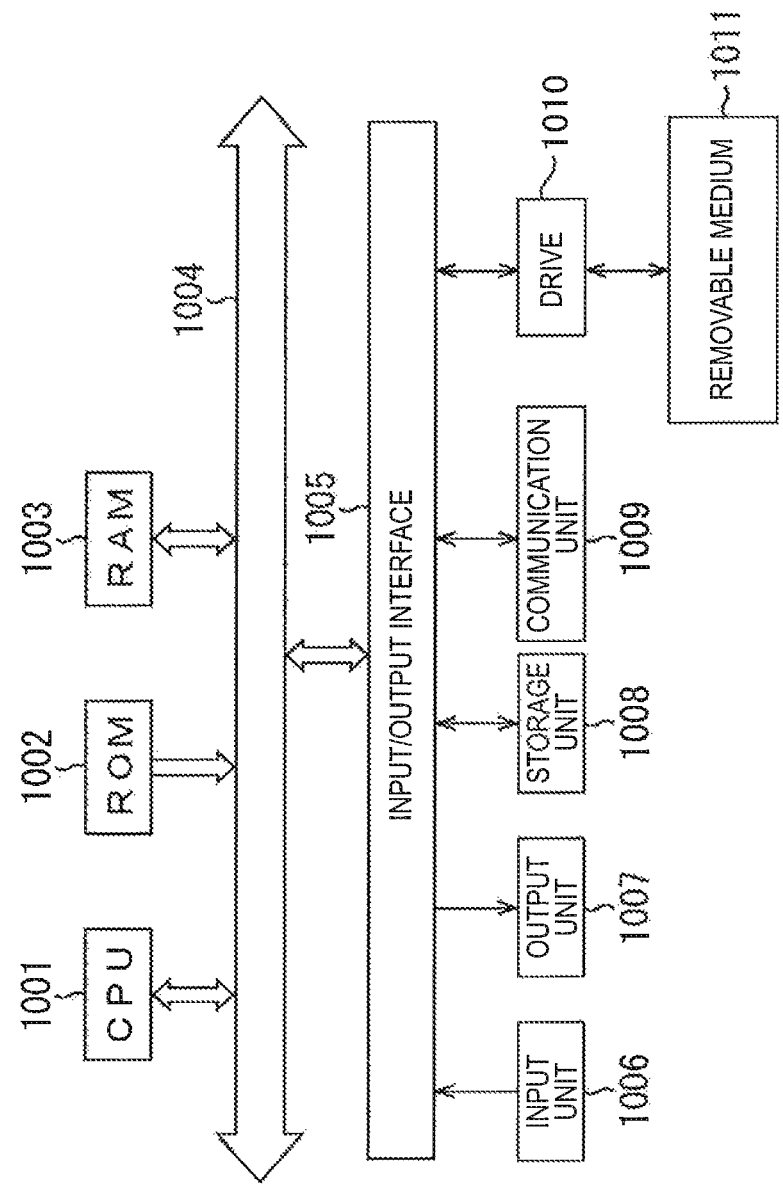

IMAGE PROCESSING DEVICE AND METHOD, AND PROGRAM FOR CORRECTING A BLURRED MOVING IMAGE

CROSS REFERENCE TO PRIOR APPLICATION

This application is a National Stage Patent Application of PCT International Patent Application No. PCT/JP2013/083296 (filed on Dec. 12, 2013) under 35 U.S.C. §371, which claims priority to Japanese Patent Application No. 2012-282611 (filed on Dec. 26, 2012), which are all hereby incorporated by reference in their entirety.

TECHNICAL FIELD

The present technology relates to image processing devices and methods, and programs, and more particularly, to an image processing device and method, and a program, capable of converting a blurred moving image into a less blurred moving image.

BACKGROUND ART

In related art, solutions for a blurred image that occurs when a video camera captures an image are classified into a mechanical approach of correcting a blur caused by mechanical factors using a sensor such as a gyro sensor when an image is captured and an electronic approach of shifting an image using the optical flow techniques.

A technique for correcting a blurred image using combination of such approaches has been developed (see Patent Literature 1).

CITATION LIST

Patent Literature

Patent Literature 1: JP 2011-217317A

SUMMARY OF INVENTION

Technical Problem

However, the above-mentioned mechanical approach has a limit to the reduction in size, and thus, for example, it is difficult to be installed in a glasses-mounted video camera.

The above-mentioned electronic approach may eliminate the use of mechanical components to achieve a more compact structure, but corrects images one by one. When the images are continuously reproduced as a moving image, the correction is performed regardless of relationship between the preceding and succeeding images. Thus, the moving image reproduced as a whole is difficult to be viewed clearly, and the viewer exhibits symptoms similar to a so-called motion sickness.

The present technology is made in view of such circumstances, and especially, when a captured moving image is reproduced, it is intended to obtain a converted moving image with less blur by allowing imaging directions to be a substantially constant direction.

Solution to Problem

According to an embodiment of the present technology, there is provided an image processing device including an acquisition unit configured to acquire information on an imaging position and an imaging direction in units of frame images that constitute a moving image obtained through capturing by an imaging unit, a converted image generation unit configured to generate a plurality of converted images having different imaging directions for each frame image that constitutes the moving image based on the frame image itself and preceding and succeeding frame images of the frame image, an evaluation value calculation unit configured to calculate an evaluation value for each converted moving image constituted by combining the converted image and the original frame image, the evaluation value being used to evaluate a blur between the converted images or between the original frame images, and a selection unit configured to select a converted moving image with less blur based on an evaluation value calculated by the evaluation value calculation unit.

A node difference calculation unit configured to calculate a difference between the converted image generated by the converted image generation unit and the original frame image as a node difference, and an edge difference calculation unit configured to calculate a difference in a time series including the converted image generated by the converted image generation unit and the original frame image as an edge difference can be further included. The evaluation value calculation unit can calculate an evaluation value used to evaluate a blur for each of converted moving images based on each of a sum of the edge difference and a sum of the node difference between the converted images or the original frame images included in the converted moving image constituted by combining the converted image and the original image.

The evaluation value calculation unit can calculate an evaluation value used to evaluate a blur for each of the converted moving images by applying a weight to each of the sum of the edge difference and the sum of the node difference between the converted images or the original frame images included in the converted moving image constituted by combination of the converted image and the original image and by calculating a sum of the weighted values.

A weight input unit configured to input a weight to be applied to the sum of the edge difference and the sum of the node difference, a sum of the weight applied to each of the sum of the edge difference and the sum of the node difference being a value of 1 can be further included. The evaluation value calculation unit can calculate an evaluation value used to evaluate a blur for each of the converted moving images by applying a weight inputted by the weight input unit to each of the sum of the edge difference and the sum of the node difference between the converted images or the original frame images included in the converted moving image constituted by combination of the converted image and the original image and by calculating a sum of the weighted values.

The storage unit can also store information on an imaging direction being changed in accordance with the original frame image by having a plurality of predetermined angles of view and by rotating to a plurality of angles in association with the converted image when the converted image is generated by the converted image generation unit. The image processing device can further include a display image generation unit configured to generate a display image that displays a route on a map based on the converted moving image or the imaging position information of the frame image of the moving image and displays by applying a different color to each imaging direction on the route based on the imaging direction information.

A specifying unit configured to specify a position on the route displayed on the map on the display image, and a reproduction unit configured to reproduce the converted moving image that constitutes the route or the moving image from a frame image including information on an imaging position corresponding to a position specified by the specifying unit can be further included.

The converted image generation unit can generate a converted image by converting each frame image that constitutes a moving image stored in the storage unit into a plurality of images having the different imaging directions by having a plurality of predetermined angles of view and by rotating to a plurality of angles by a technique including an angle of view shift, homograph)/transformation, and viewpoint composition, using the frame image itself and preceding and succeeding frame images of the frame image.

The converted image generation unit can generate a plurality of higher-resolution converted images having the different imaging directions for each frame image that constitutes a moving image stored in the storage unit by using a pixel generated by a phase shift equal to or smaller than a pixel based on the frame image itself and preceding and succeeding frame images of the frame image.

The imaging unit configured to capture the moving image can be further included. The acquisition unit can store the information on the imaging position and the imaging direction of the frame image in association with each of the frame images.

According to an embodiment of the present technology, there is provided an image processing method including acquiring information on an imaging position and an imaging direction in units of frame images that constitute a moving image obtained through capturing by an imaging unit, generating a plurality of converted images having different imaging directions for each frame image that constitutes the moving image based on the frame image itself and preceding and succeeding frame images of the frame image, calculating an evaluation value for each converted moving image constituted by combining the converted image and the original flame image, the evaluation value being used to evaluate a blur between the converted images or between the original frame images, and selecting a converted moving image with less blur based on a calculated evaluation value.

According to an embodiment of the present technology, there is provided a program for causing a computer to execute processing including an acquisition step of acquiring information on an imaging position and an imaging direction in units of frame images that constitute a moving image obtained through capturing by an imaging unit, a converted image generation step of generating a plurality of converted images having different imaging directions for each frame image that constitutes the moving image based on the frame image itself and preceding and succeeding frame images of the frame image, an evaluation value calculation step of calculating an evaluation value for each converted moving image constituted by combining the converted image and the original frame image, the evaluation value being used to evaluate a blur between the converted images or between the original frame images, and a selection step of selecting a converted moving image with less blur based on an evaluation value calculated by processing of the evaluation value calculation step.

In an embodiment of the present technology, information on an imaging position and an imaging direction in units of frame images that constitute a moving image obtained through capturing by an imaging unit is acquired, a plurality of converted images having different imaging directions for each frame image that constitutes the moving image based on the frame image itself and preceding and succeeding frame images of the frame image are generated, an evaluation value being used to evaluate a blur between the converted images or between the original frame images for each converted moving image constituted by combining the converted image and the original frame image, and a converted moving image with less blur based on a calculated evaluation value is selected.

The image processing device according to an embodiment of the present technology may be a stand-alone device or may be a block that performs information processing.

Advantageous Effects of Invention

According to the embodiments of the present technology, a blurred moving image can be converted into a less blurred moving image by an easy operation.

BRIEF DESCRIPTION OF DRAWINGS

FIG. 17 is a diagram illustrated to describe an exemplary configuration of a general purpose personal computer.

DESCRIPTION OF EMBODIMENTS

Exemplary Configuration of Imaging System

Figure 1:
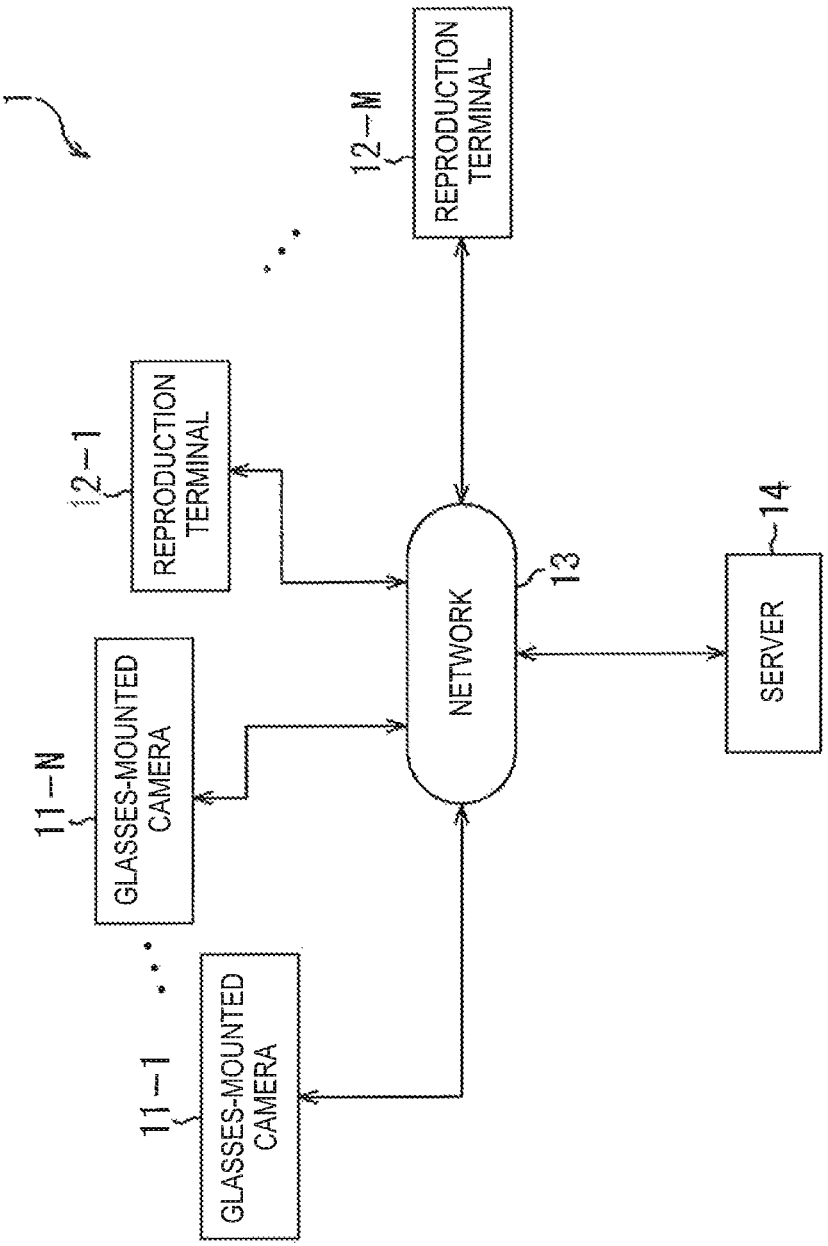
FIG. 1 is a diagram illustrating an exemplary general configuration of an embodiment of an image processing system to which the present technology is applied.

FIG. 1 is a diagram illustrating an exemplary configuration of an image processing system to which the present technology is applied. The image processing system 1 shown in FIG. 1 is configured to include glasses-mounted cameras 11-1 to 11-N, reproduction terminals 12-1 to 12-M, a network 13, and a server 14. The glasses-mounted cameras 11-1 to 11-N are simply referred to as a glasses-mounted camera 11, and the reproduction terminals 12-1 to 12-M are simply referred to as a reproduction terminal 12, as long as it is not especially necessary to distinguish between the components with the same name. This is similarly applicable to other components.

In the image processing system 1 shown in FIG. 1, a moving image captured by the glasses-mounted camera 11 is transmitted to the server 14 and is stored therein. When a user of the glasses-mounted camera 11 operates the reproduction terminal 12 and accesses the server 14, the stored moving image is reproduced and is viewed by the user.

More specifically, the glasses-mounted camera 11 captures a moving image, adds imaging position and imaging direction information to each of frame images that constitute the captured moving image, and generates a moving image file having a time length of approximately 1 minute. The glasses-mounted camera 11 then transmits the resulting moving image file to the server 14 via the network 13. The server 14 assigns an index to the moving image file to which the imaging position and imaging direction in frame units, which is supplied from the glasses-mounted camera 11, are added, and then the server 14 stores the indexed moving image file. The server 14, when accessed by the reproduction terminal 12 operated by the user, generates a corrected moving image with less blur based on the imaging direction information and generates a display image that displays the user's moving path on a map, with the user wearing the glasses-mounted camera 11 and capturing a moving image, based on the imaging position information. The server 14 distributes the generated images together to the reproduction terminal 12. The corrected moving image generated by the server 14 is obtained by correcting the stored image into a less blurred image. When the reproduction terminal 12 obtains a map image on which a route corresponding to the moving path is marked, the reproduction terminal 12 displays the map image. When any one position in the route corresponding to the moving path on the map image is selected, the reproduction terminal 12 reproduces and displays a moving image starting from the image captured at the imaging position corresponding to the selected position. Thus, the user of the glasses-mounted camera 11 can specify any moving path on the map without considering information such as imaging capabilities or image-captured time. This allows the user to enjoy viewing images captured by the user while searching an image desired to be viewed.

Exemplary Appearance Configuration of Glasses-Mounted Camera

Figure 2:
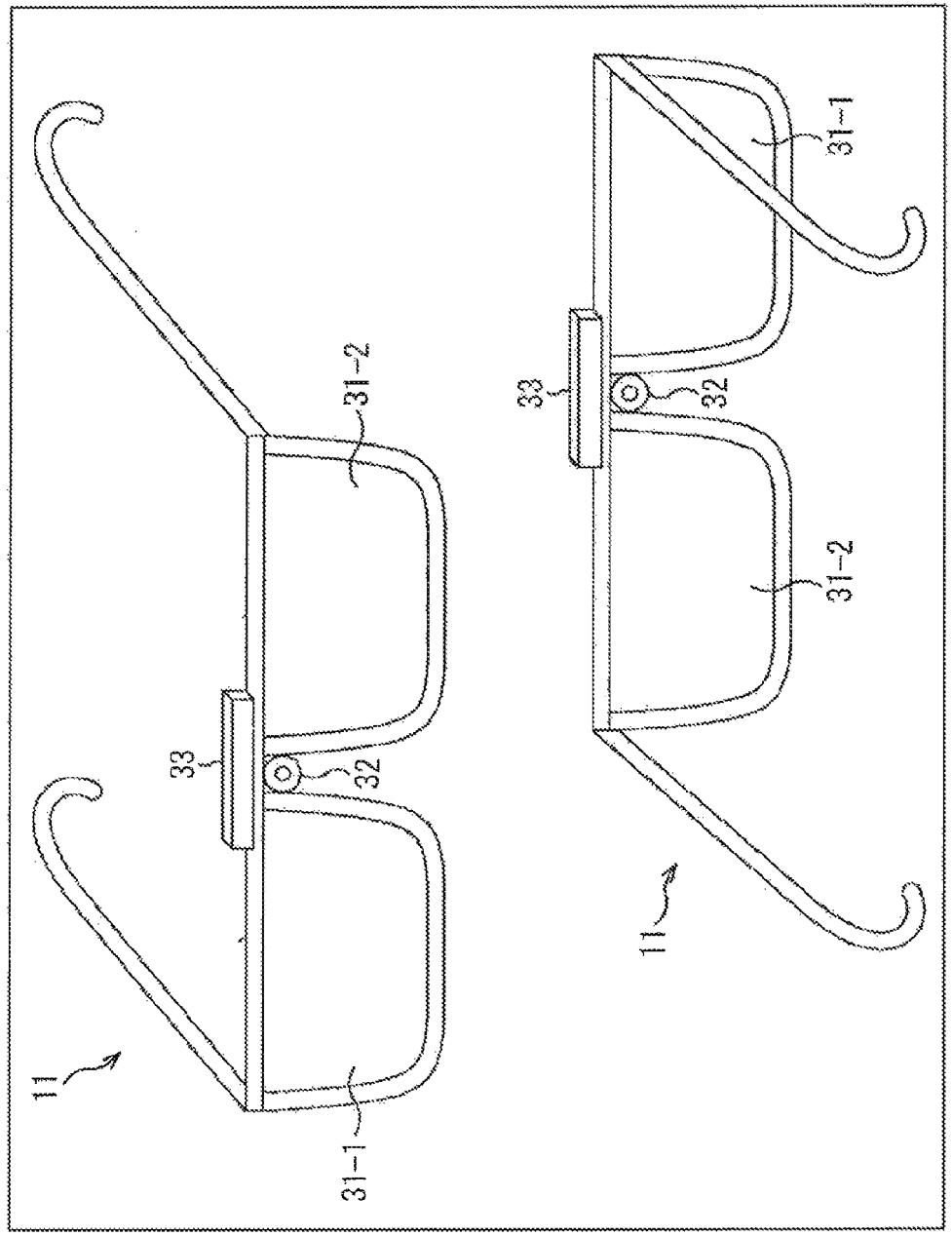
FIG. 2 is a diagram illustrating an exemplary appearance configuration of a glasses-mounted camera shown in FIG. 1.

An exemplary appearance configuration of the glasses-mounted camera 11 will be described with reference to FIG. 2. The glasses-mounted camera 11 may be such a thing as shown in FIG. 2, and when the user wears it like wearing eyeglasses, an imaging unit 32 captures a view image observed by the user through a pair of lenses 31-1 and 31-2.

The glasses-mounted camera 11 is configured to include the lenses 31-1 and 31-2, the imaging unit 32, and a control unit 33. The lenses 31-1 and 31-2 may be an ordinary spectacle lens. The imaging unit 32 may be composed of a charge-coupled device (CCD) or complementary metal oxide semiconductor (CMOS) sensor. The imaging unit 32 compresses a captured moving image according to a predetermined format and supplies the compressed moving image to the control unit 33. The control unit 33 generates a moving image file having a time length of approximately 1 minute from the moving images captured sequentially using various components shown in FIG. 3, and transmits the generated moving image file to the server 14.

Exemplary Configuration of Implementing Glasses-Mounted Camera Functions

Figure 3:
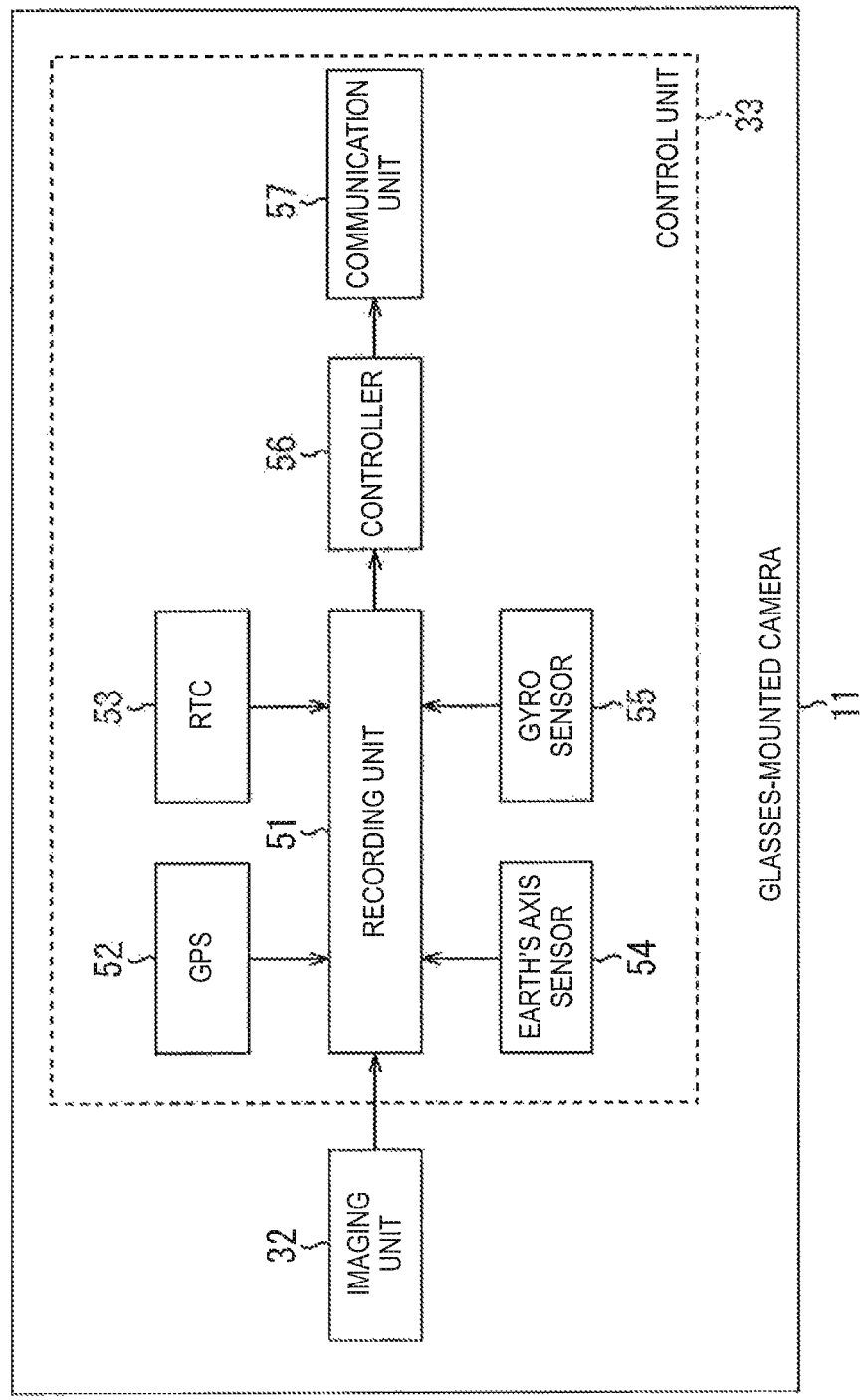
FIG. 3 is a diagram illustrated to describe a functional configuration for implementing the glasses-mounted camera shown in FIG. 1.

An exemplary configuration for implementing functions of the glasses-mounted camera 11 will be described with reference to FIG. 3. The glasses-mounted camera 11 is provided with the imaging unit 32 and the control unit 33, as described with reference to FIG. 2. The control unit 33 is configured to include a recording unit 51, a global positioning system (GPS) 52, a real time clock (RTC) 53, an earth's axis sensor 54, a gyro sensor 55, a controller 56, and a communication unit 57. The recording unit 51 temporarily records the moving images supplied sequentially from the imaging unit 32. In this case, the recording unit 51 acquires imaging direction information that is obtained from position information supplied from the GPS 52, time information supplied from the RTC 53, direction information of the earth's axis supplied from the earth's axis sensor 54, information on yaw, pitch, and roll angular velocity supplied from the gyro sensor 55. The recording unit 51 records the acquired information in association with each frame image that constitutes the captured moving image. More specifically, the recording unit 51 estimates an imaging direction of the image unit 32 based on the information on yaw, pitch, and roll angular velocity and the direction information of the earth's axis detected by the earth's axis sensor 54. The recording unit 51 stores the estimated imaging direction information in association with the frame image. The recording unit 51 generates a moving image file at predetermined time intervals from the moving images supplied sequentially from the imaging unit 32, and supplies the generated moving image file to the controller 56.

The GPS 52 receives radio waves from a satellite (not shown) and calculates latitude and longitude information to be used as position information on the earth. The GPS 52 supplies the calculated information to the recording unit 51 as information indicating an imaging position. The RTC 53 manages an actual time and supplies information indicating the image-captured time to the recording unit 51. The earth's axis sensor 54 detects an inclination relative to the earth's axis in the direction of the glasses-mounted camera 11 and supplies the detected results to the recording unit 51. The gyro sensor 55 detects yaw, pitch, and roll angular velocity and supplies the detected results to the recording unit 51.

The controller 56 controls the overall operation of the control unit 33 of the glasses-mounted camera 11. The controller 56 controls the recording unit 51 to generate a moving image file having a predetermined time length, for example, a time length of approximately 1 minute based on moving image data supplied from the imaging unit 32, and acquires the generated moving image file. The controller 56 controls the communication unit 57 to transmit the generated moving image file to the server 14 via the network 13.

Exemplary Configuration for Implementing Reproduction Terminal Functions

Figure 4:
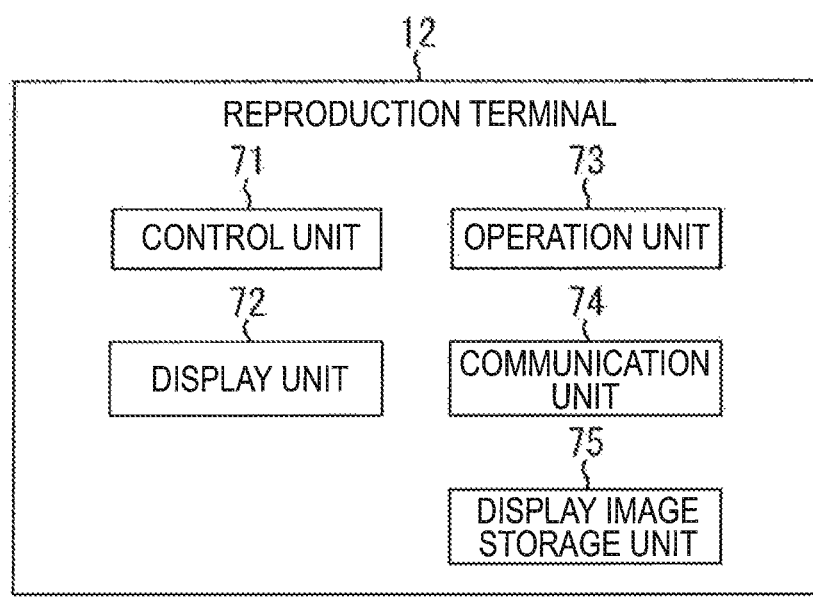
FIG. 4 is a diagram illustrated to describe a functional configuration for implementing a reproduction terminal shown in FIG. 1.

An exemplary configuration for implementing functions of the reproduction terminal 12 will be described with reference to FIG. 4.

The reproduction terminal 12 is configured to include a control unit 71, a display unit 72, an operation unit 73, a communication unit 74, and a display image storage unit 75. The control unit 71 controls the overall operation of the reproduction terminal 12. The display unit 72 may include a liquid-crystal display (LCD), an organic electro-luminescence (EL) display, or other display devices. The display unit 72 displays a display image composed of a map supplied from the server 14 or displays a reproduction image composed of a moving image file supplied from the server 14. The operation unit 73 may include a keyboard, a mouse, or operation buttons. When the user operates the operation unit 73 to input various commands and instructions, the operation unit 73 supplies an operation signal corresponding to the user's operation to the control unit 71. The communication unit 74 transmits and receives data and commands to and from the server 14 via the network 13 under the control of the control unit 71. The display image storage unit 75 stores a display image used as user interface (UI) that is necessary to allow a moving image file stored in the server 14 to be selected and reproduced. An example of the display image to be stored includes a map image that is necessary as an interface image.

Exemplary Configuration for Implementing Server Functions

Figure 5:
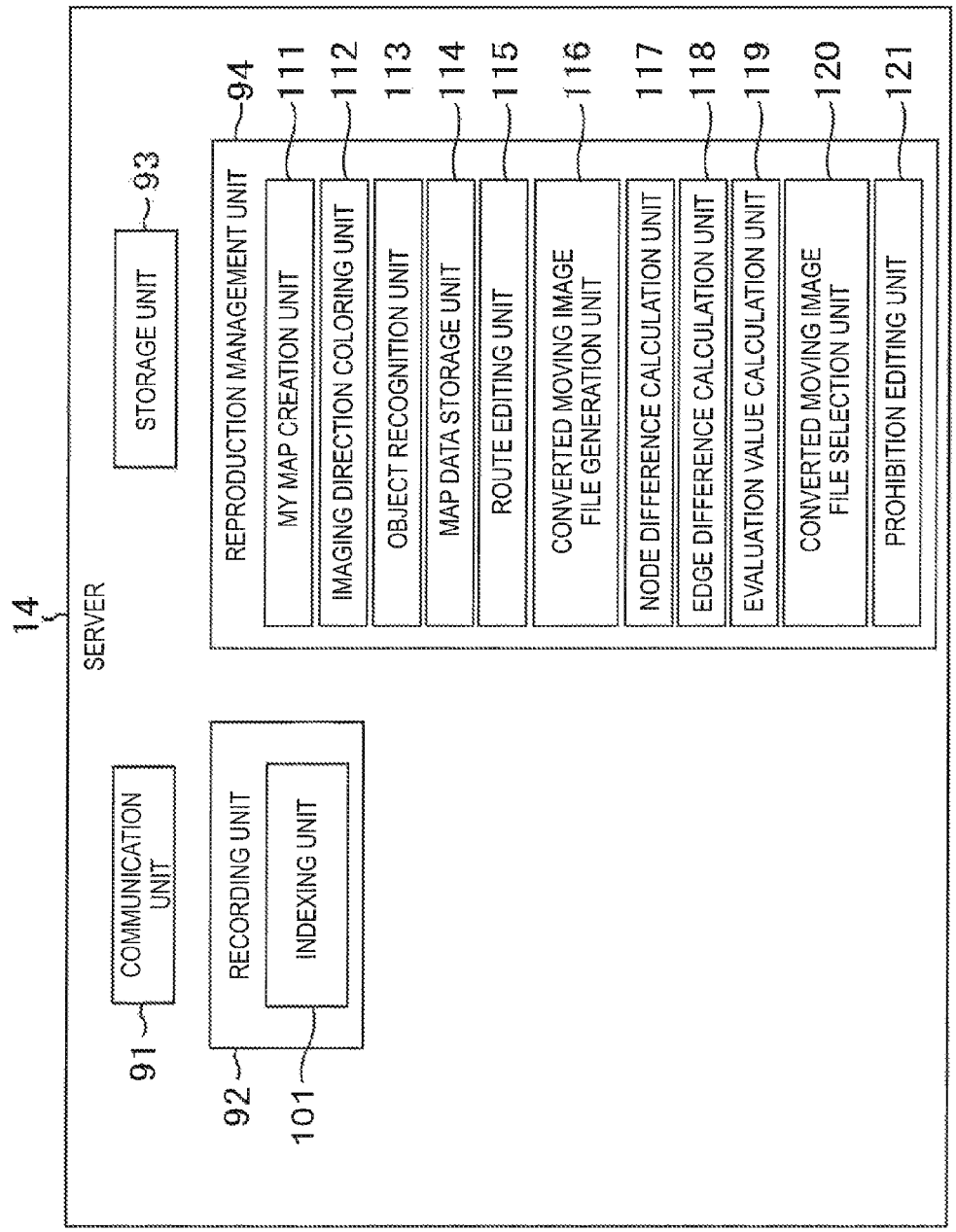
FIG. 5 is a diagram illustrated to describe a functional configuration for implementing a server shown in FIG. 1.

An exemplary configuration for implementing functions of the server 14 will be described with reference to FIG. 5.

The server 14 is configured to include a communication unit 91, a recording unit 92, a storage unit 93, and a reproduction management unit 94. The communication unit 91 transmits and receives data, a moving image file, and various commands from and to the glasses-mounted camera 11 and the reproduction terminal 12 via the network 13. The recording unit 92 is provided with an indexing unit 101. The recording unit 92 sequentially receives a moving image file having a time length of approximately 1 minute transmitted from the glasses-mounted camera 11. The recording unit 92 allows the indexing unit 101 to generate an index for each moving image file based on a frame image included in the moving image file and information about the imaging position and imaging direction added to the frame image, and to assigns a generated index to each moving image file. The recording unit 92 then stores an indexed moving image file in the storage unit 93.

The reproduction management unit 94 generates a display image that displays a route indicating the moving path of the user based on the imaging position of the captured image on a map stored in advance when the reproduction management unit 94 is instructed by the reproduction terminal 12 to reproduce the captured moving image file via the communication unit 91. The generation of the display image is performed based on the imaging position and imaging direction stored in frame image units of the moving image file stored in the storage unit 93. The reproduction management unit 94 corrects an image of the moving image file stored in the storage unit 93 to be an image with reduced blur and supplies the corrected moving image file to the reproduction terminal 12.

More specifically, the reproduction management unit 94 is configured to include a My Map creation unit 111 an imaging direction coloring unit 112, an object recognition unit 113, a map data storage unit 114, a route editing unit 115, a converted moving image file generation unit 116, a node difference calculation unit 117, an edge difference calculation unit 118, an evaluation value calculation unit 119, and a converted moving image file selection unit 120.

The My Map creation unit 111, when instructed by the reproduction terminal 12 to reproduce a moving image file via the communication unit 91, reads the moving image file instructed to be reproduced from the storage unit 93. The My Map creation unit 111 specifies a route indicating the moving path of the user and generates a display image, called My Map, to be displayed on a map stored in the map data storage unit 114 while capturing an image that constitutes the moving image file. The specification and generation by the My Map creation unit 111 are performed based on information indicating the imaging position stored for each frame image that constitutes the moving image file instructed to be reproduced. The My Map is distributed to the reproduction terminal 12 together with the moving image file and is displayed on the reproduction terminal 12. The displayed map is divided into sections with a step size according to the number of frame images captured at the same position. When a position on the map is pointed by using a pointer or the like, a frame image corresponding to the pointed position is displayed or a moving image file from the frame image captured at the corresponding imaging position is reproduced.

The imaging direction coloring unit 112 applies different colors to the corresponding positions on a route displayed on My Map used as the display image described above, based on the imaging direction information stored in association with frame images included in the moving image file. This process allows a frequent change in colors on a route to indicate a frequency change in imaging directions. Thus, when the moving image file is reproduced and is viewed by the user without any modification, blur will be more visible and the user who views the moving image file feels motion sickness. On the other hand, when colors on a route remain unchanged in some sections, it means that the imaging direction is kept constant in the sections. Thus, when the moving image file is reproduced and is viewed by the user without any modification, blur will be less visible and the user who views the moving image file does not feel motion sickness.

The object recognition unit 113 recognizes an object in an image for each frame image, extracts the recognized object image, adds information on the recognized object to the object image, and stores it in the storage unit 93 in a classified fashion. The object images constitute the XrossMediaBar, which will be described later, and are displayed in a selectable state for each object when the display image of My Map described above is generated.

The map data storage unit 114 stores data of a map image on the earth and supplies the map data to the My Map creation unit 111 when the My Map creation unit 111 creates a My Map.

The route editing unit 115 edits a route obtained by plotting information that indicates an imaging position on the My Map based on the imaging position information included in the header for each frame image included in the moving image file stored in the storage unit 93.

The converted moving image file generation unit 116 generates multiple kinds of converted images by performing an angle of view conversion or rotation processing for converting the imaging direction with the use of the preceding and succeeding frame images or the like for each frame image included in the moving image file stored in the storage unit 93. The converted moving image file generation unit 116 then generates the converted moving image file composed of converted images and stores the converted moving image file in the storage unit 93. In this time, the converted moving image file generation unit 116 stores the converted moving image file by adding information on the imaging direction changed by the conversion processing to the converted frame image.

The node difference calculation unit 117 calculates a node difference by obtaining a difference between the converted image and an original image before conversion for each of the converted images. The node difference calculation unit 117 calculates a sum of difference between nodes in converted images or original images of all patterns included in the converted moving image file, which is generated by combining converted images or original images in various patterns in time series.

The edge difference calculation unit 118 calculates an edge difference by obtaining a difference between converted images or original images, which are arranged in time series. The edge difference calculation unit 118 calculates a sum of edge difference between converted images or original images of all patterns included in the converted moving image file, which is generated by combining converted images or original images in various patterns in time series.

The evaluation value calculation unit 119 obtains an evaluation value of each of the converted moving image file by calculating a sum total of the sum of difference between nodes and the sum of difference between edges, in the converted moving image file of the pattern which is generated by combining converted images or original images in various patterns in time series. In this case, the evaluation value calculation unit 119 acquires weight information supplied from the reproduction terminal 12 and applies a weight to each of the node difference sum and the edge difference sum to calculate an evaluation value.

The converted moving image file selection unit 120 selects a moving image file having the smallest evaluation value from among all of the converted moving image files of the pattern that is generated by combining converted images or original images in various patterns in time series. The converted moving image file selection unit 120 transmits the selected moving image file to the reproduction terminal 12, which requests to reproduce the moving image file, via the communication unit 91.

A prohibition editing unit 121 searches a region to be prohibited from being reproduced in the images instructed to be reproduced for each frame image that constitutes the moving image file instructed to be reproduced, based on the imaging position and time information added to the frame image. The prohibition editing unit 121 performs a process for changing the searched region into, for example, a mosaic image. In other words, in the image captured by the glasses-mounted camera 11, a prohibited region may include a region containing information such as personally identifiable information, a region in which military secret or the like specified based on position information is seemed to be captured, and a region that may have a problem if disclosure is made at a predetermined time.

Imaging and Recording Process

Figure 6:
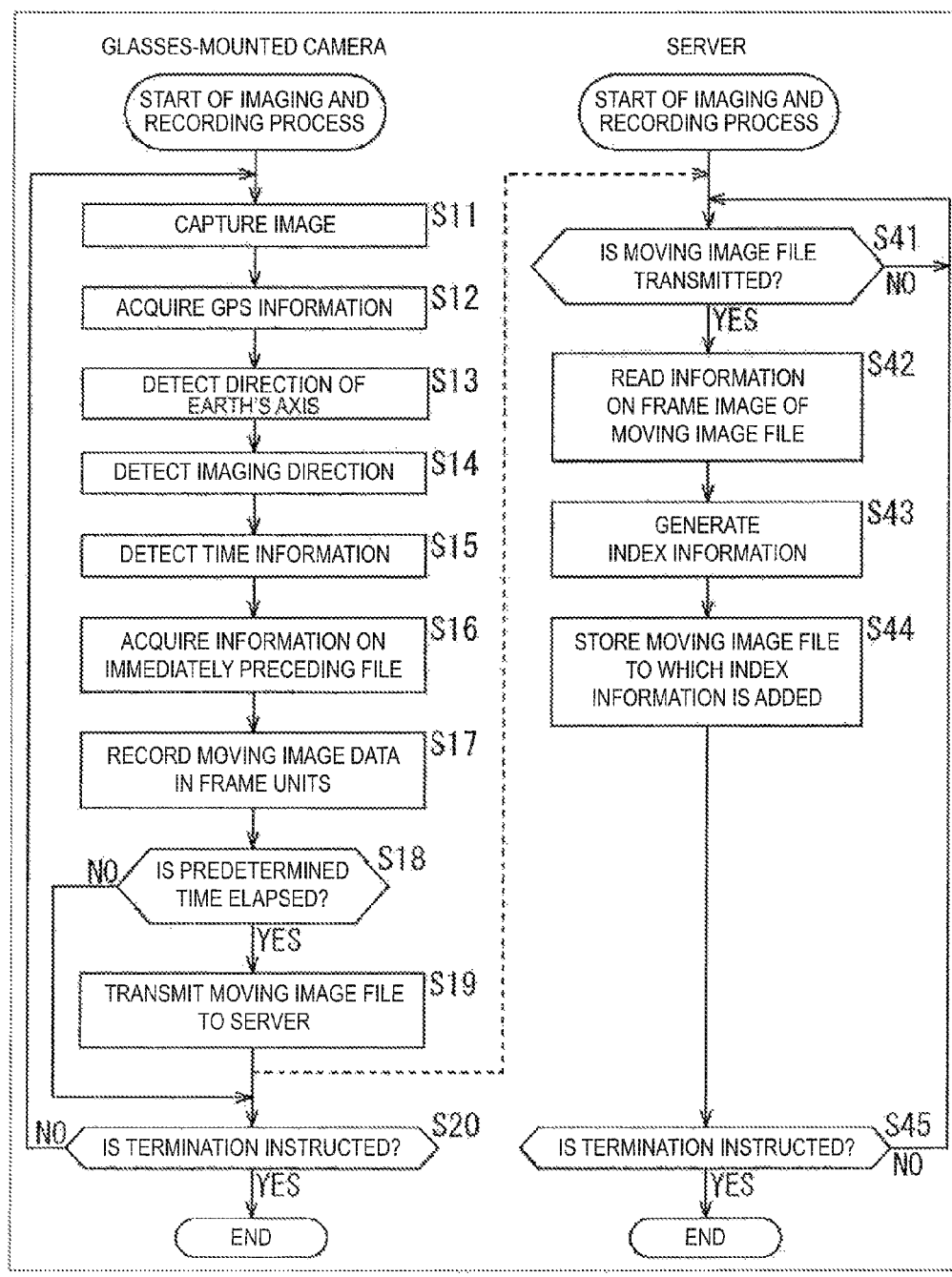
FIG. 6 is a flowchart illustrated to describe an imaging and recording process.

The imaging and recording process in the image processing system shown in FIG. 1 will be described with reference to FIG. 6. This process starts when an operation unit (not shown) of the glasses-mounted camera 11 is operated and the imaging unit 32 is instructed to start capturing an image.

In step S11, the imaging unit 32 captures an image and supplies the captured image data to the recording unit 51.

In step S12, the GPS 52 receives radio waves from a satellite (not shown), calculates latitude and longitude to be used as a position on the earth, and supplies the position information on the earth including the latitude and longitude obtained as the calculation results to the recording unit 51.

In step S13, the earth's axis sensor 54 measures an inclination relative to the direction of the earth's axis and supplies information on the inclined angle of the glasses-mounted camera 11 relative to the direction of the earth's axis obtained as the measurement results to the recording unit 51.

In step S14, the gyro sensor 55 detects yaw, pitch, and roll angular velocity in the glasses-mounted camera 11 and supplies information on each angular velocity obtained as the detected results to the recording unit 51. This process allows the recording unit 51 to calculate and store an imaging direction based on the inclined angle relative to the earth's axis and the yaw, pitch, and roll angular velocity.

In step S15, the RTC 53 reads current time information and supplies the read current time information to the recording unit 51.

In step S16, the recording unit 51 acquires information on the immediately preceding moving image file.

In step S17, the recording unit 51 records moving image data in frame image units. In this case, the recording unit 51 sets the imaging position indicating the position information on the earth, the image-captured time indicating the supplied time, the imaging direction, and the immediately preceding moving image file information as a header of each frame at the timing of capturing each frame image, and stores these information in the moving image file to be accumulated in a sequential manner. The recording unit 51 records an address on the network being in use, a media access control (MAC) address or the like as information for identifying itself on the header of each frame image.

In step S18, the recording unit 51 determines whether a predetermined time is elapsed based on a difference between the current time supplied from the RTC 53 and the time at which a new moving image file starts to be stored. In step S18, if a predetermined time is determined to be elapsed, the process proceeds to step S19.

In step S19, the recording unit 51 determines that a predetermined time is elapsed, and then the recording unit 51 closes the stored moving image file and supplies the generated moving image file to the controller 56. The controller 56, when receiving the supplied moving image file, controls the communication unit 57 to supply the received moving image file to the server 14 via the network 13. In step S18, if it is determined that a predetermined time is not elapsed, the process in step S19 is skipped.

In step S20, the imaging unit 32 determines whether an instruction to terminate the imaging operation of a moving image is issued based on an operation signal from an operation unit (not shown). If it is determined that termination is instructed, the process ends. On the other hand, in step S20, if it is determined that termination is not instructed, the process returns to step S11 and the subsequent steps are repeated until the instruction of termination is issued. In step S18, if it is determined that a predetermined time is not elapsed, the process in step S19 is skipped.

Figure 7:
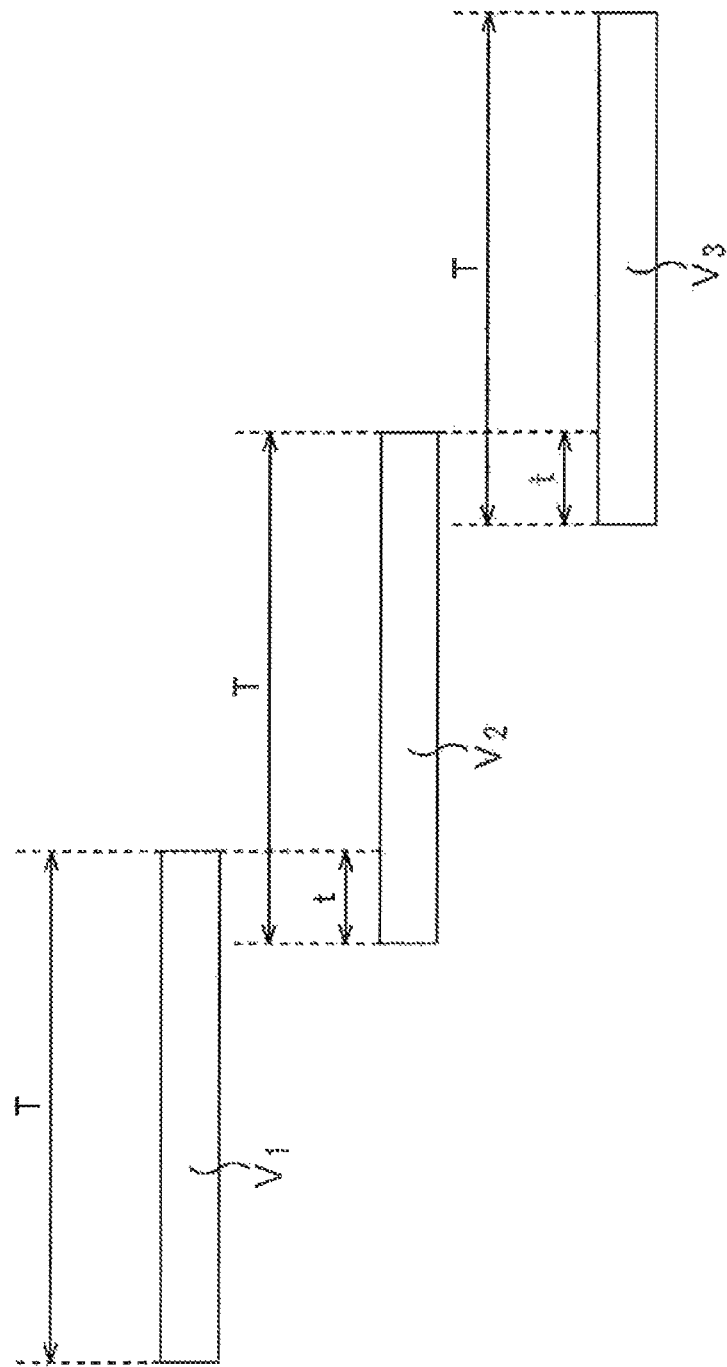
FIG. 7 is a diagram illustrated to describe a configuration of a captured moving image file.

The moving image files are recorded at a predetermined time interval T of approximately one minute, and the moving image files are configured to overlap with each other by only a predetermined time t, as shown in FIG. 7. In other words, in FIG. 7, a moving image file V1 is configured as a moving image file captured by only the length of the predetermined time T. The next moving image file V2 is configured so that the time t of, for example approximately 10 seconds, before the moving image file V1 ends has the same moving image data as the time t after the moving image file V2 starts. The subsequent moving image file V3 is configured so that the time t before the moving image file V2 ends has the same moving image data as the time t after the moving image file V3 starts. This configuration of moving image files allows only a portion with a time length of 40 seconds in the moving image file to be lost even when a moving image file, which is being transmitted to the server 14, does not reach the server 14 due to any accident on the network 13. It is also possible to reduce the load on the network 13 caused by excessively large capacity of the moving image file.

On the other hand, in the server 14, in step S41, the recording unit 92 controls the communication unit 91 and determines whether a moving image file is transmitted from any one glasses-mounted camera 11 on the network 13. The recording unit 92 then repeats this process until the moving image file is transmitted. In step S41, for example, if the moving image file is transmitted in the process of step S19, the process proceeds to step S42.

In step S42, the recording unit 92 controls the communication unit 91 to acquire the transmitted moving image file. The recording unit 92 controls the indexing unit 101 to read information of frame images included in the moving image file and to read information for identifying a glasses-mounted camera 11 and information including an image, an imaging position, and an image-captured time, which are necessary for indexing. The frame image to be read for indexing includes a typical person's face image, a typical landscape, a typical building, or the like. The imaging position and image-captured time to be used for indexing may be, respectively, the imaging position and an image-captured time of the leading frame image.

In step S43, the indexing unit 101 generates an index based on the information read as index information.

In step S44, the indexing unit 101 adds the generated index information to the transmitted moving image file. The recording unit 92 stores the indexed moving image file in the storage unit 93.

This process allows the image captured by the glasses-mounted camera 11 to be recorded on the server 14 as an indexed moving image file having a time length of approximately one minute.

Reproduction Image Selection Image Displaying Process

Figure 8:
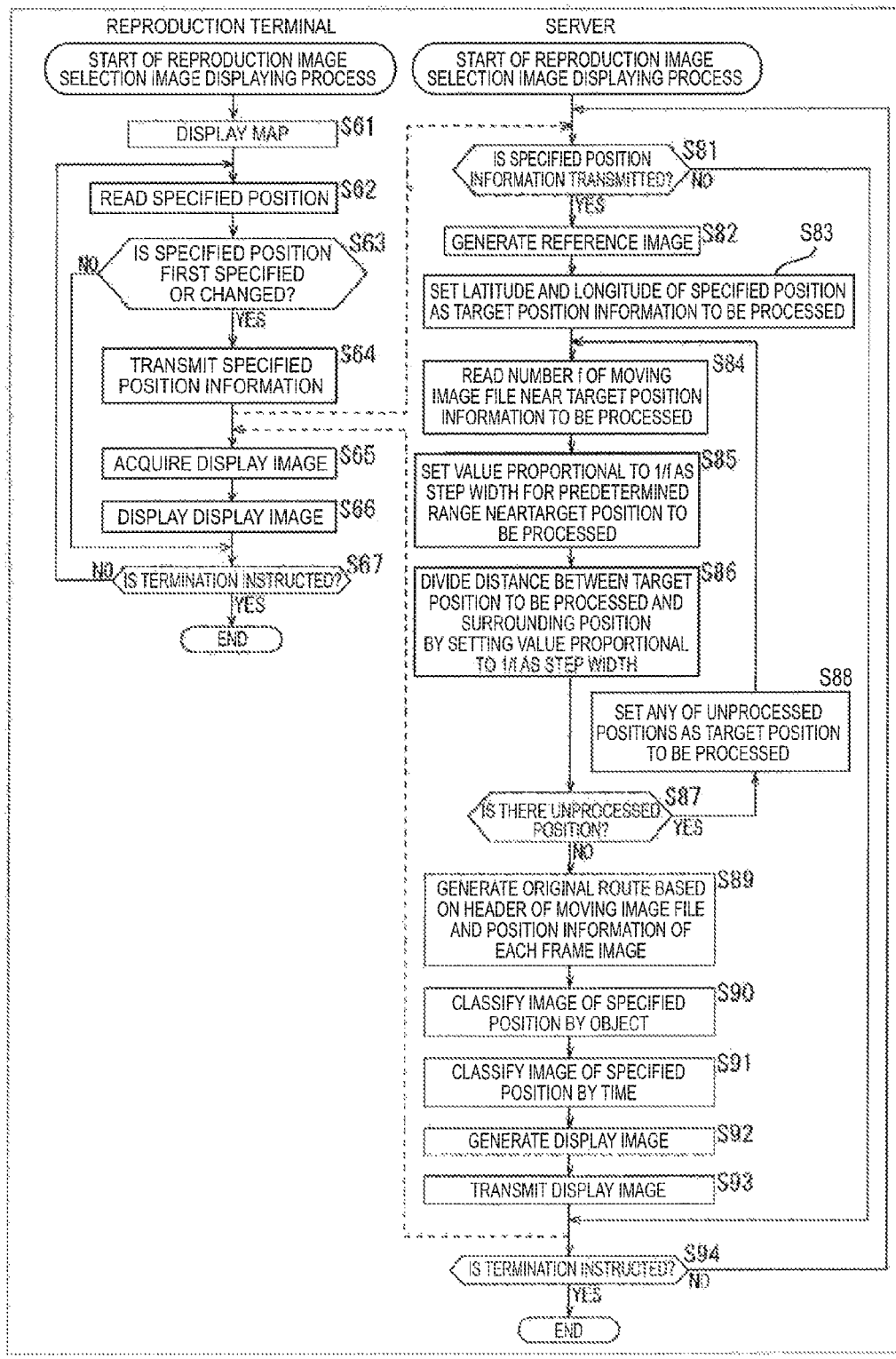
FIG. 8 is a flowchart illustrated to describe a reproduction image selection image displaying process.

A reproduction image selection image displaying process will be described with reference to the flowchart shown in FIG. 8. This process is based on the assumption that the moving image file is stored in the storage unit 93 of the server 14 by the imaging and recording process described with reference to the flowchart shown in FIG. 6.

In step S61, the control unit 71 reads a map image stored in the display image storage unit 75 and display surrounding images of the home position set in advance.

In step S62, the control unit 71 reads specified position information on a map. In the initial process, information on the home position is read as the specified position information. In the subsequent processes, a position specified by the user who operates the reproduction terminal 12 is read as the specified position information by the operation of an operation unit (not shown).

In step S63, the control unit 71 determines whether or not the specified position information is the initial position information or newly specified position information. For example, it is determined that the specified position information is the initial position information or newly specified position information, the process proceeds to step S64.

In step S64, the control unit 71 controls the communication unit 74 to transmit the specified position information to the server via the network 13.

In step S81, the reproduction management unit 94 controls the communication unit 91 to determine whether the specified position information is transmitted. In step S81, for example, if it is determined that the specified position information is transmitted in the process of step S64, the process proceeds to step S82.

In step S82, the reproduction management unit 94 controls the My Map creation unit 111 to read map data near the specified position information from among the map data stored in the map data storage unit 114 based on the specified position information, and generates a reference image for the My Map. The reference image for the My Map may be a map image display field m shown in FIG. 9. In the map image display field m shown in FIG. 9, a street named "A avenue" running from top to bottom of the map is displayed on the left side in the figure. In the map, a crossroad is displayed in a road going from the branch near the middle of the street to the right side in the figure, and a building named "C building" is displayed in a corner of the crossroad. A structure named "D house" is displayed in the further right side in the figure along the road beyond the crossroad with the "C building" at the corner. By turning right from a T-junction with the "D house" at the corner and then going to the left side, a highway named "B highway" is displayed on the map.

In step S83, the My Map creation unit 111 sets the latitude and longitude of the specified position as a target position to be processed.

In step S84, the My Map creation unit 111 searches index information of the moving image file stored in the storage unit 93, and measures the number f of moving image files at the surrounding positions, based on the latitude and longitude information in target position information to be processed.

In step S85, the My Map creation unit 111 sets a step width F of the number of pixels proportional to 1/f for a given range near the target position to be processed.

In step S86, the My Map creation unit 111 divides a given range near the target area to be processed by the step width F.

In step S87, the My Map creation unit 111 determines whether an unprocessed position is in the selected map image. If an unprocessed position is determined to be in the map image, the process proceeds to step S88.

In step S88, the My Map creation unit 111 sets any of the unprocessed positions as a target position to be processed, and then the process returns to step S84. In other words, the process in steps S84 to S88 is repeated until all the positions in the image read as a map image are set as the target position to be processed and the image is divided by the step width F according to the number of moving image files. When all of the positions are set as the target position to be processed, none of the unprocessed positions is assumed to be within the map image in step S87, and then the process proceeds to step S89.

Figure 9:
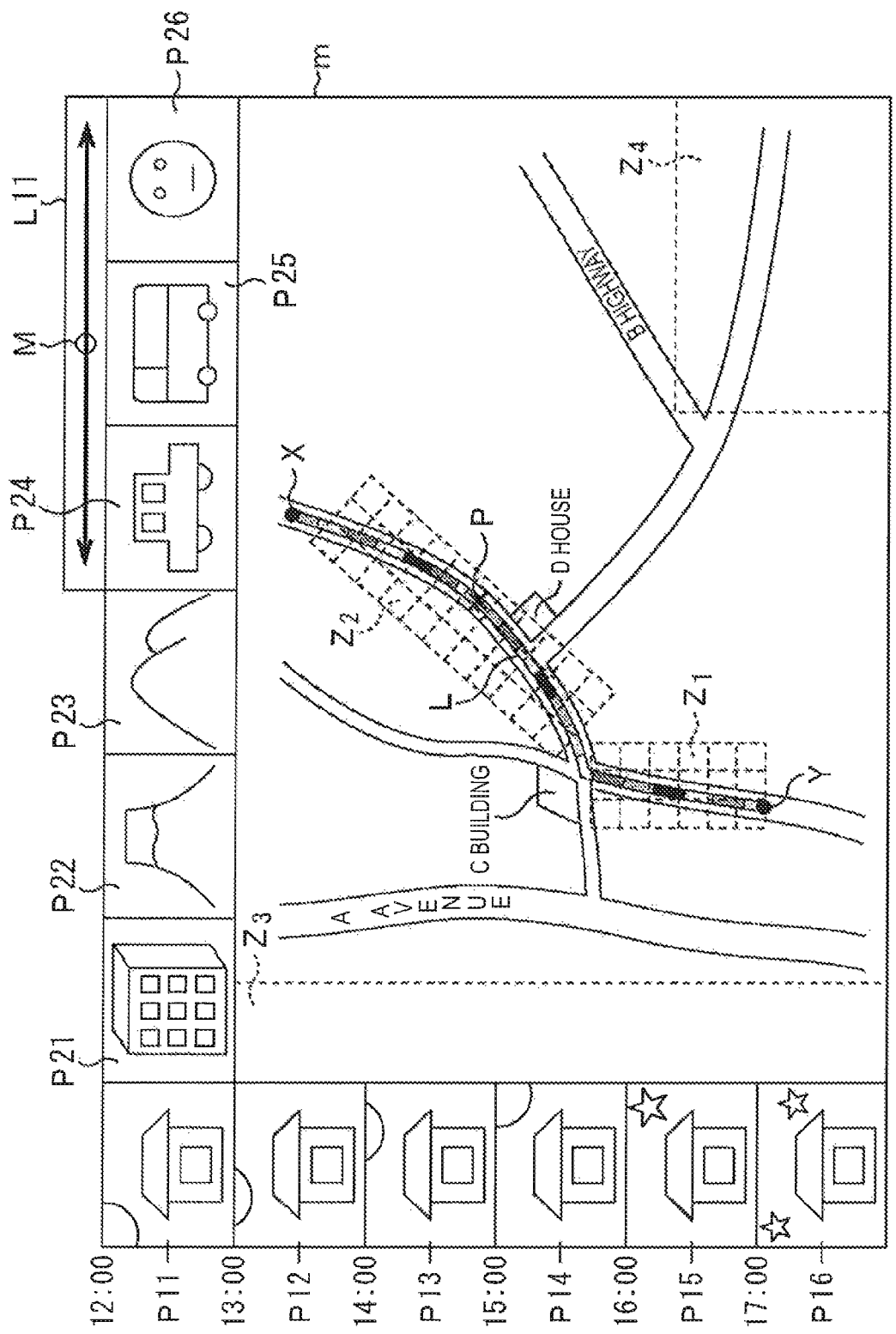
FIG. 9 is a diagram illustrated to describe an exemplary display of My Map that is a reproduction image selection image.

In other words, as shown in FIG. 9, on the map, a region Z1 near a position Y and a region Z2 near the position P or X are divided into smaller regions by a smaller step width as indicated by the dotted line. This division is performed according to the number of moving image files registered in association with the positions on the map image. This indicates that numerous moving image files are recorded. On the other hand, in the regions Z3 and Z4, and regions other than the regions Z1 and Z2, there is no area bounded substantially by the dotted line. This indicates that a moving image file does not substantially exist. In other words, this display makes it easy to view a position at which numerous moving image files exist and a position at which a moving image file does not exist.

As shown in FIG. 9, when the reproduction image selection image called My Map is displayed on the display unit 72 of the reproduction terminal 12 and any one position in a mass of regions surrounded by the dotted line is specified using a pointer or other device (not shown), an instruction to reproduce a moving image file corresponding to the specified position is supplied to the server. The server 14 sequentially transmits frame images included in the corresponding moving image file in response to the reproduction instruction. The reproduction terminal then reproduces the moving image file. In this case, at the time of selection before the reproduction is instructed, information including a still image or image-captured time that constitutes a header may be displayed.

In step S89, the route editing unit 115 plots information indicating an image-captured position of a frame image in which the image-captured position exists on a map image displayed on the My Map in association with time information. The route editing unit 115 creates a route by obtaining a moving path of the user wearing the glasses-mounted camera 11 that captures the frame image included in the moving image file and displays the route on the display screen. In this time, the imaging direction coloring unit 112 reads information indicating the imaging direction included in the header of each of the plotted frame images that constitute the route created by the route editing unit 115 and adds different colors depending on the imaging direction to the route.

In other words, for example, this process allows a route L to be displayed, as shown at positions X to Y. As shown in FIG. 9, the route L is displayed by adding different colors to each imaging direction of the frame images included in the moving image file at each position. As a result, the range in which the color on the route L is greatly changed indicates that the imaging direction is frequently changed. Thus, in general, the imaging direction frequently changed at the time of viewing causes the moving image to induce motion sickness. On the other hand, the range with a small change in colors indicates that the change in the imaging directions has low frequency. Thus, in general, the imaging direction infrequently changed at the time of viewing causes the moving image easy to be viewed and difficult to induce motion sickness.

Figure 10:
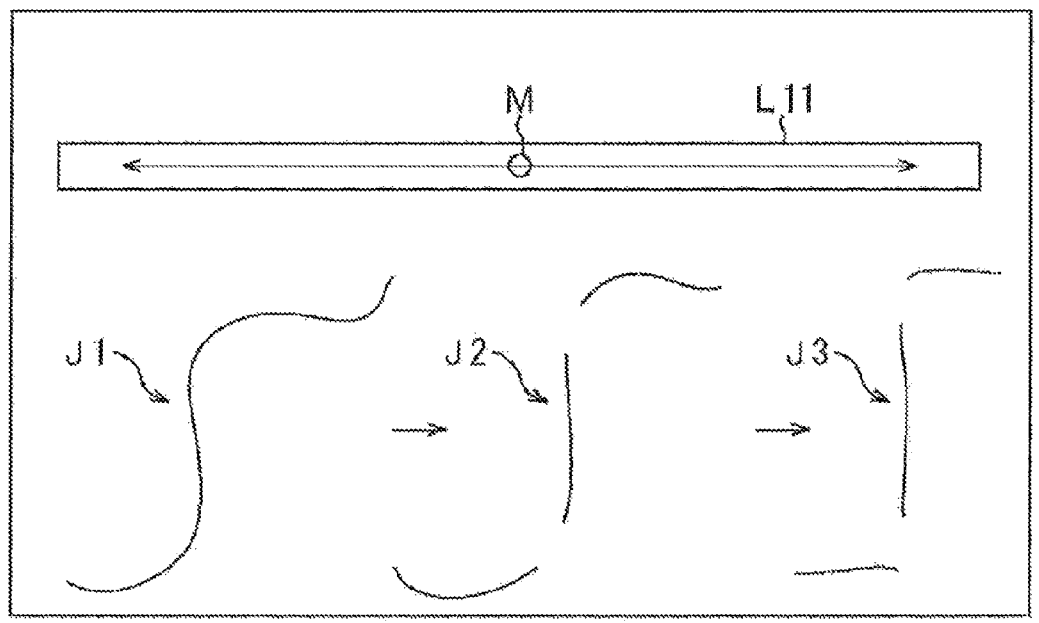
FIG. 10 is a diagram illustrated to describe how to operate a correction knob.

The change in the imaging directions may be corrected by moving a correction knob M shown in the upper right of FIG. 9 to the left and right on a correction scale shown by a horizontal arrow. In other words, as shown in FIG. 10, as the correction knob M is moved to the left in the figure, the route becomes an image similar to the frame image included in the inputted moving image file as shown by the state of a route J1. Thus, it is reproduced without any modification even when the imaging direction is frequently changed. In this case, the frame image similar to the state obtained upon capturing may be used and thus individual frame images are difficult to be collapsed, but when the change in the imaging direction is large, the moving image is difficult to view and induces motion sickness.

On the other hand, as shown in FIG. 10, as the correction knob M is moved to the right in the figure, the route becomes an image dissimilar from the frame image included in the inputted moving image file as shown by the state of a route J3. In this case, the correction of the imaging direction makes the individual frame images to be a state in which it is easy to be collapsed, but the image imaging directions are aligned to some extent and thus it is relatively easy to view the moving image. In the state of routes J2 and J3 shown in FIG. 10, some portions of the route may be cut out because the collapsed image is intended to be removed. These routes J1 to J3 indicate that actual image-captured positions, that is, the route corresponding to the moving path of the user wearing the glasses-mounted camera 11 is close to a straight line by unifying the imaging directions A route correction process performed by operating the correction knob M will be described later in detail with reference to the flowchart of FIG. 11.

In step S90, the object recognition unit 113 classifies and extracts the type of objects included in the frame image that constitutes the moving image file at the specified position.

In step S91, the object recognition unit 113 extracts time information from the object image extracted from each of the objects classified from the frame image included in the moving image file at the specified position and classifies the extracted time information by every time.

In step S92, the My Map creation unit 111 associates the object images classified by the object type of the image by the object recognition unit 113 with the time information, and the My Map creation unit 111 displays the associated object images using the XrossMediaBar as shown in FIG. 9. The XrossMediaBar is constituted by images P11 to P16 and images P21 to P26, shown in FIG. 9. In other words, the images P11 to P16 are set in the vertical direction on the basis of time. In FIG. 9, the images P11 to P16 are the same object of house and are classified by time from 12 AM (12:00) to 5 PM (17:00). It is possible to display the images recognized as the same object in time series by moving it in the vertical direction.

The images P11 and P21 to P26 are displayed in the horizontal direction for each type of objects classified according to a predetermined rule. It is possible to select the classified objects by moving it in the horizontal direction. Thus, in FIG. 9, a house image P11 that is classified as an object of a structure is displayed on the upper left. A building image P21 that is classified as an object of a structure, a mountain image P22 that is covered with snow on the top and is classified as an object of a mountain, a mountain image P23 that has two peaks and is classified as an object of a structure, a passenger car image P24 that is classified as an object of an automobile, a bus image P25 that is classified as an object of an automobile is displayed, and a face image P26 that is classified as an object of a person are displayed in this order to the right of the image P21.

In FIG. 9, when the specified position is a position indicated by the position P, the images P11 and P21 to P26, which are classified as an object at the position, are displayed in the form of a horizontal bar (bar-shaped display field). When the image at the upper left corner is selected by moving it in the horizontal direction, the time-series images recognized as having the same object are displayed in such a way as to display the images P11 to P16. As a result, when the user captures an image with the glasses-mounted camera 11 while walking the same route, it is possible to observe a change of the same object like as it is captured with a fixed-point camera. The selection of these images makes it possible to generate a command to start the reproduction from the reproduction position of the moving image file including the selected frame image. This process allows the user to select an object that the user wants to view among the moving image files and to specify the desired time. Thus, the user can instruct a reproduction process by specifying the position to start the reproduction adapted for the purpose from a large amount of moving image files.

In step S93, the reproduction management unit 94 controls the communication unit 91 to transmit the reproduction image selection image called My Map as shown in FIG. 9 to the reproduction terminal 12 via the network 13.

In step S81, if the specified position information is not transmitted, steps S82 to S93 are skipped.

In step S94, the reproduction management unit 94 determines whether an instruction to terminate the operation by an operation unit (not shown) is issued. If it is determined that an instruction to terminate is not issued, the process returns to step S81 and the subsequent steps are repeated. In step S94, if it is determined that an instruction to terminate the operation is issued, the process ends.

On the other hand, in the reproduction terminal 12, in step S65, the control unit 71 controls the communication unit 74 to obtain display image information called My Map that is the reproduction image selection image transmitted from the server 14.

In step S66, the control unit 71 displays a display image called My Map, which is the reproduction image selection image received through the communication unit 74, on the display unit 72.

In step S67, the control unit 71 determines whether an instruction to terminate the operation is issued by the operation unit 73. If it is determined that an instruction to terminate the operation is not issued, the process returns to step S62 and the subsequent steps are repeated. On the other hand, in step S67, if it is determined that an instruction to terminate the operation is issued, the process ends.

In step S63, if it is determined that the specified position is not a position specified initially and is not changed, the process of steps S64 to S66 is repeated. In other words, when the display image selection image is displayed on the display unit 72, a state where the My Map that is the same display image selection image is displayed is kept, as long as the specified position is not changed.

This process allows the moving image file to be reproduced by specifying a position on the route displayed according to the image-captured position when a large amount of images are captured with the glasses-mounted camera 11. Thus, the user can appropriately select the reproduction position of a moving image without memorizing the captured date and time or the like. The XrossMediaBar displayed by the images P11 to P16 and P21 to P26 makes it possible to specify a reproduction start position of the moving image file from a desired object or image-captured time to reproduce it.

Route Correction Process

Figure 11:
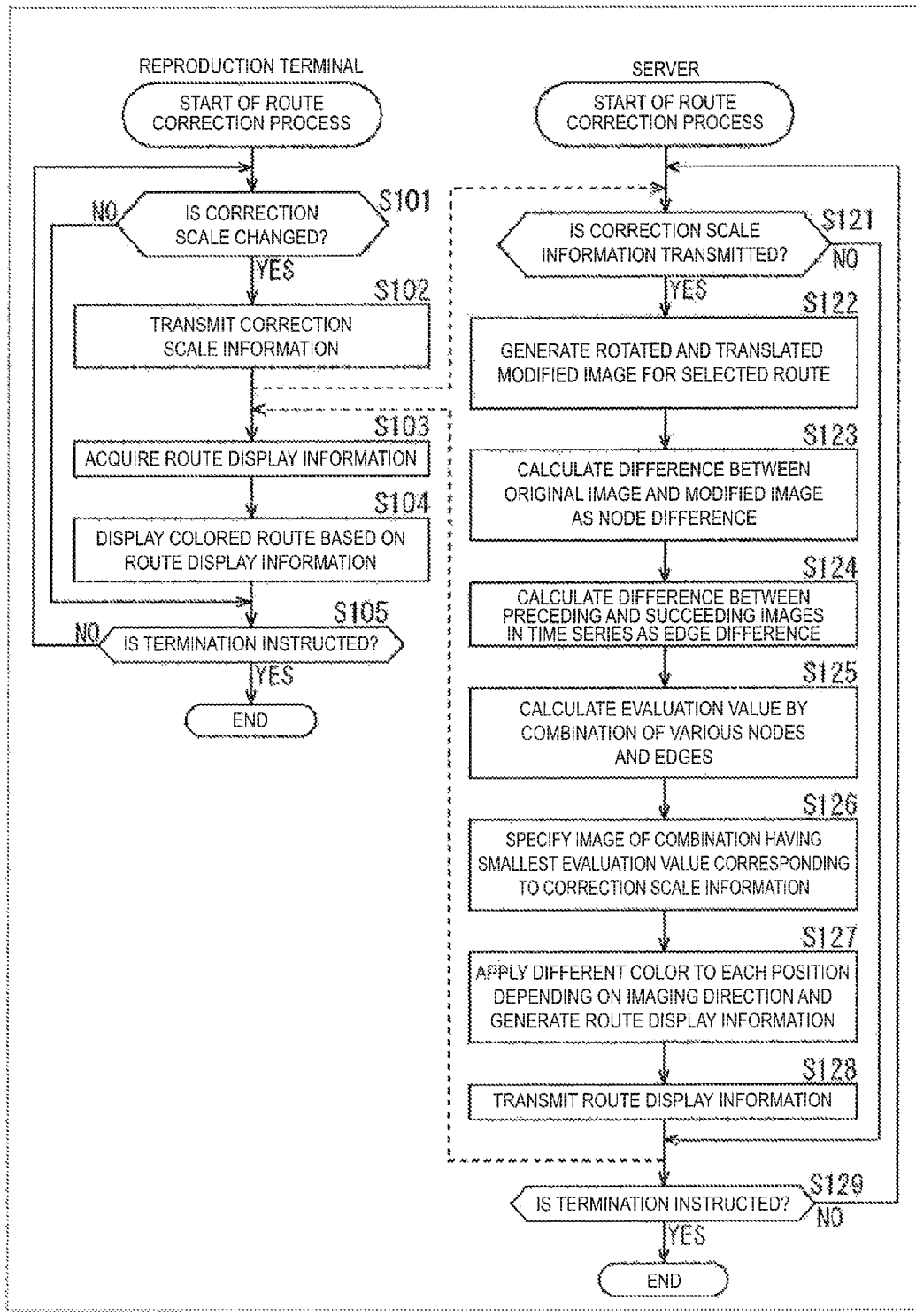
FIG. 11 is a flowchart illustrated to describe a route correction process.

A route correction process will be described with reference to the flowchart of FIG. 11. The route correction process is based on the assumption that the My Map that is the display image selection image is displayed.

In step S101, the control unit 71 determines whether the correction knob M is moved and the correction scale is operated by a control of the operation unit 73. If it is determined that the correction knob M is moved and the correction scale is operated in step S101, the process proceeds to step S102.

In step S102, the control unit 71 controls the communication unit 74 to transmit information indicating a position on the arrow-shaped correction scale shown in FIG. 9 of the operated correction knob M to the server 14 via the network 13.

In step S121, the route editing unit 115 of the reproduction management unit 94 determines whether operation position information of the correction knob M that is the detail of the operation of the correction scale is transmitted by controlling the communication unit 91. In step S121, for example, if it is determined that information indicating the position of the correction knob M is transmitted by the process in step S102, the process proceeds to step S122.

In step S122, the converted moving image file generation unit 116 reads a moving image file in which a position plotted on the route L displayed in the display image selection image transmitted to the reproduction terminal 12 is included in the index of the image-captured position from the storage unit 93. The converted moving image file generation unit 116 generates a new converted image to be changed to the predetermined types of angles by performing an angle of view conversion or rotation conversion on the frame image included in the read moving image file by using the preceding and succeeding images or the like. More specifically, the converted moving image file generation unit 116 generates the converted image by performing an angle of view shift, homography transformation, viewpoint composition, or the like.

Figure 12:
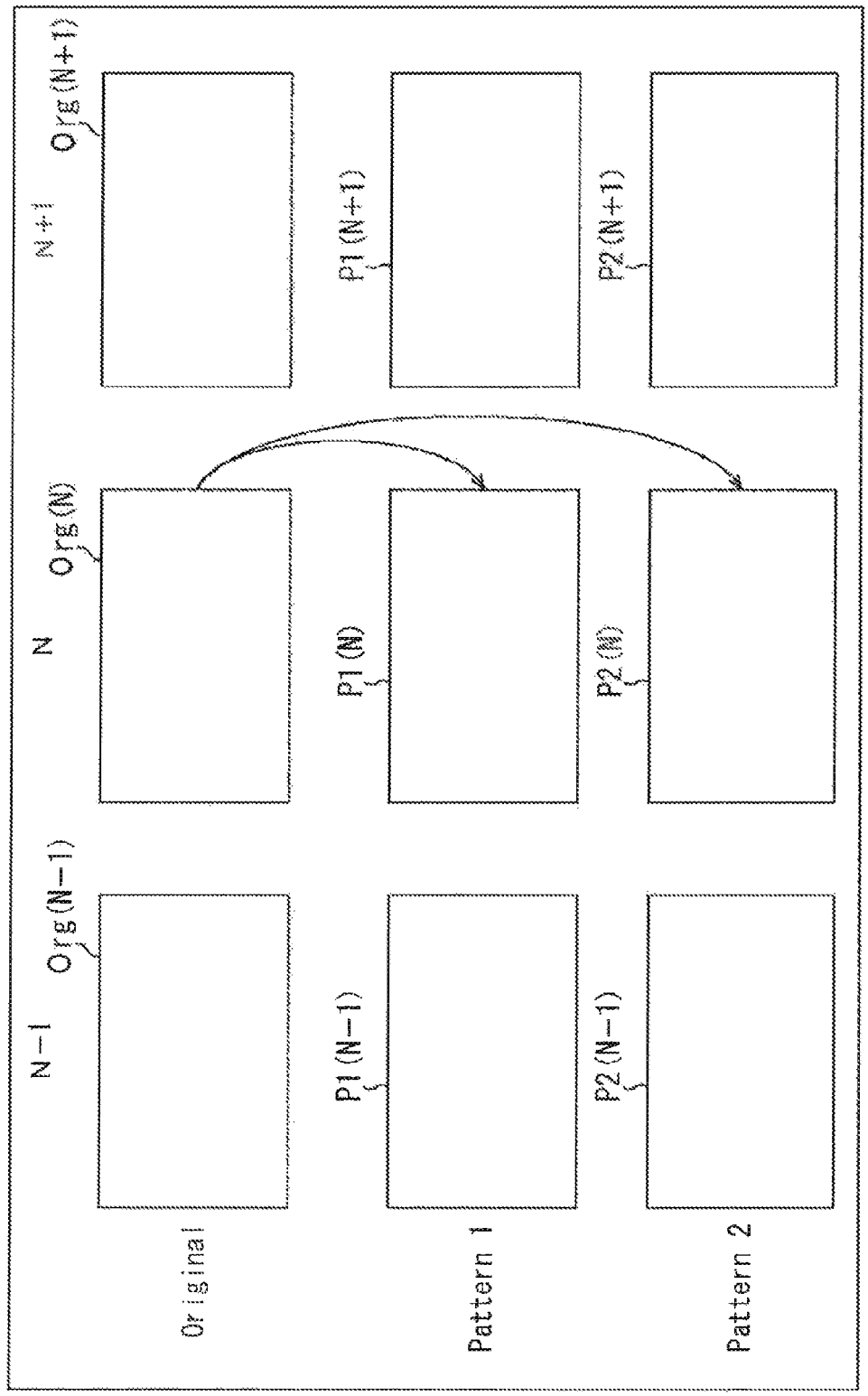
FIG. 12 is a diagram illustrated to describe a node difference that is a difference between an original image and a converted image.

In other words, the converted moving image file generation unit 116 converts images of frame images Org(N−1) to Org(N+1) included in an original moving image file stored in the storage unit 93 as shown in the upper part of FIG. 12 into images of converted images P1(N−1) to P1(N+1) as shown by Pattern1 in the middle part and converted images P2(N−1) to P2(N+1) as shown by Pattern2 in the lower part of FIG. 12, by performing an angle of view conversion or rotation conversion using the surrounding images.

The converted moving image file generation unit 116, when generating a converted image, may generate a converted image with high resolution by using pixels generated by the phase shift equal to or smaller than a pixel in the preceding and succeeding images of a target frame image to be processed.

In step S123, the node difference calculation unit 117 calculates a node difference by obtaining a difference between each frame image generated using an angle of view conversion and rotation conversion and an original frame image. In other words, the node difference calculation unit 117 calculates a node difference $Error\_n(Org(N),P1(N))$ between the original image Org(N) and the converted image P1(N) as shown in FIG. 12. The difference to be calculated may be a sum total of pixel value differences between pixels at the same position of each image. The difference to be calculated may also be a sum total of pixel value differences between pixels at the same position of each image of an image Org(N)' obtained by compensating the image Org(N) by the global motion compensation technique and the converted image P1. The difference to be calculated may also be an average value or variance of optical flows of the original image Org(N) and the converted image P1(N).

Figure 13:
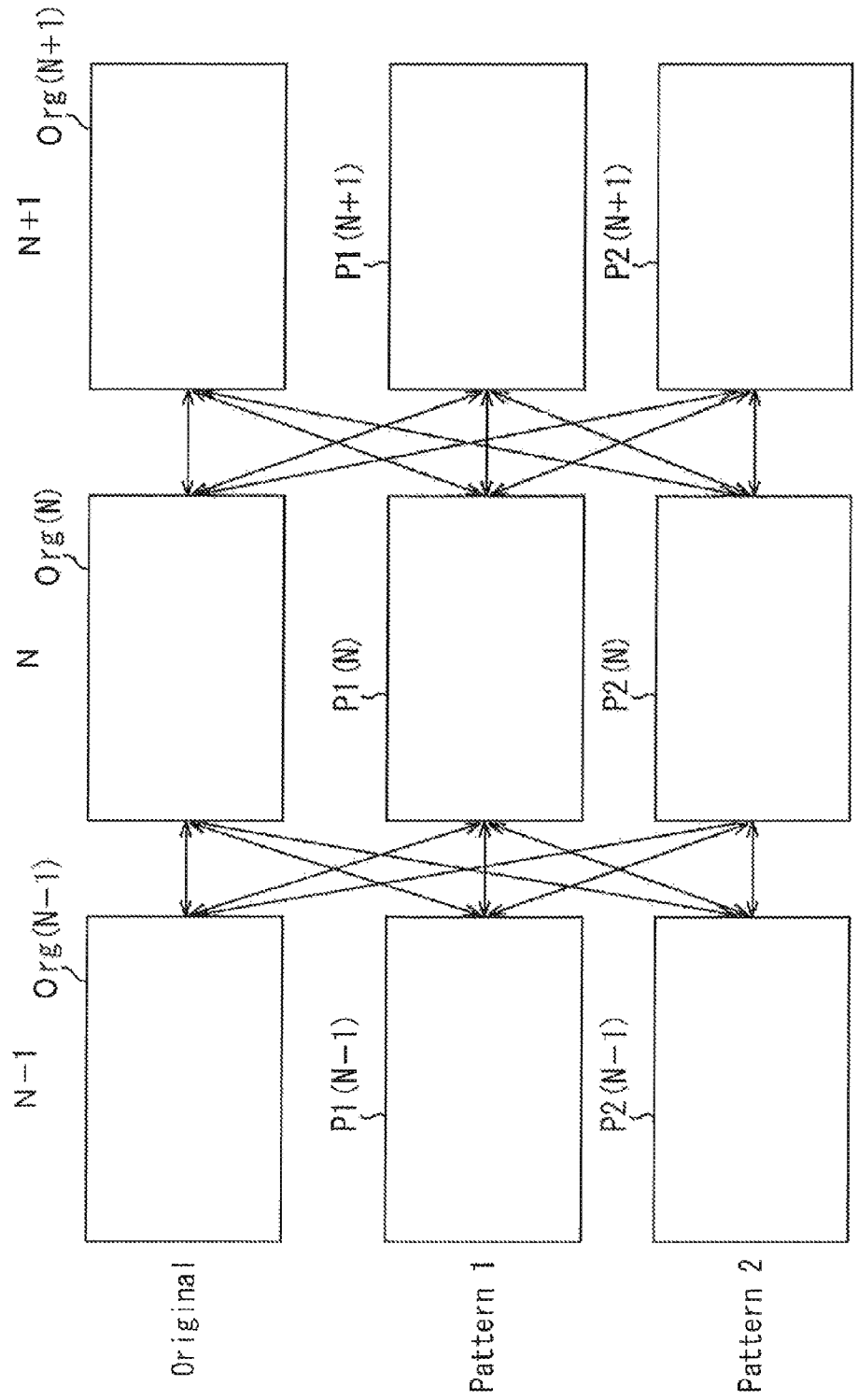
FIG. 13 is a diagram illustrated to describe an edge difference that is a difference between the preceding and succeeding images in time series of original images or converted images.

In step S124, the edge difference calculation unit 118 calculates a difference between the preceding and succeeding images for each of all patterns when the converted images, which are generated by the converted moving image file generating unit 116 and are obtained by performing various angle of view conversion and rotation conversion processing, are placed in time series in various ways. In other words, as shown in FIG. 13, the image Org(N), the converted image P1(N), and the converted image P2(N) are arranged as images placed next to the original image Org(N−1), and thus a difference between the preceding and succeeding patterns for all the patterns is calculated as an edge difference. In other words, in this case, Error_e(Org(N−1),Org(N)), Error_e(Org(N−1),P1(N)), and Error_e(Org(N−1),P2(N)) are calculated. For the difference obtained in this process, a technique similar to the calculation of difference used to calculate the node difference may be used, or other techniques may be used.

In step S125, the evaluation value calculation unit 119 calculates an evaluation value E using a sum total of node differences Error_nAll and a sum total of edge differences Error_eAll of the frame image arranged for each pattern of all the patterns. The sum total of node differences Error_nAll and the sum total of edge differences Error_eAll are respectively calculated using a node difference and an edge difference obtained by combining each arrangement pattern of the image Org, the image P1, and the image P2. The evaluation value E is represented by the following Equation.

$$E=(1-W)\times \text{Error\_eAll}+W\times \text{Error\_nAll}$$

In the above Equation, E is an evaluation value for the entire moving image file when the frame image and the converted image are arranged in time series in a predetermined pattern, w is a weight corresponding to the amount of movement of the correction knob M and ranges from 0 to 1, Error_nAll is the sum total of node differences, and Error_eAll is the sum total of edge differences.

Figure 14:
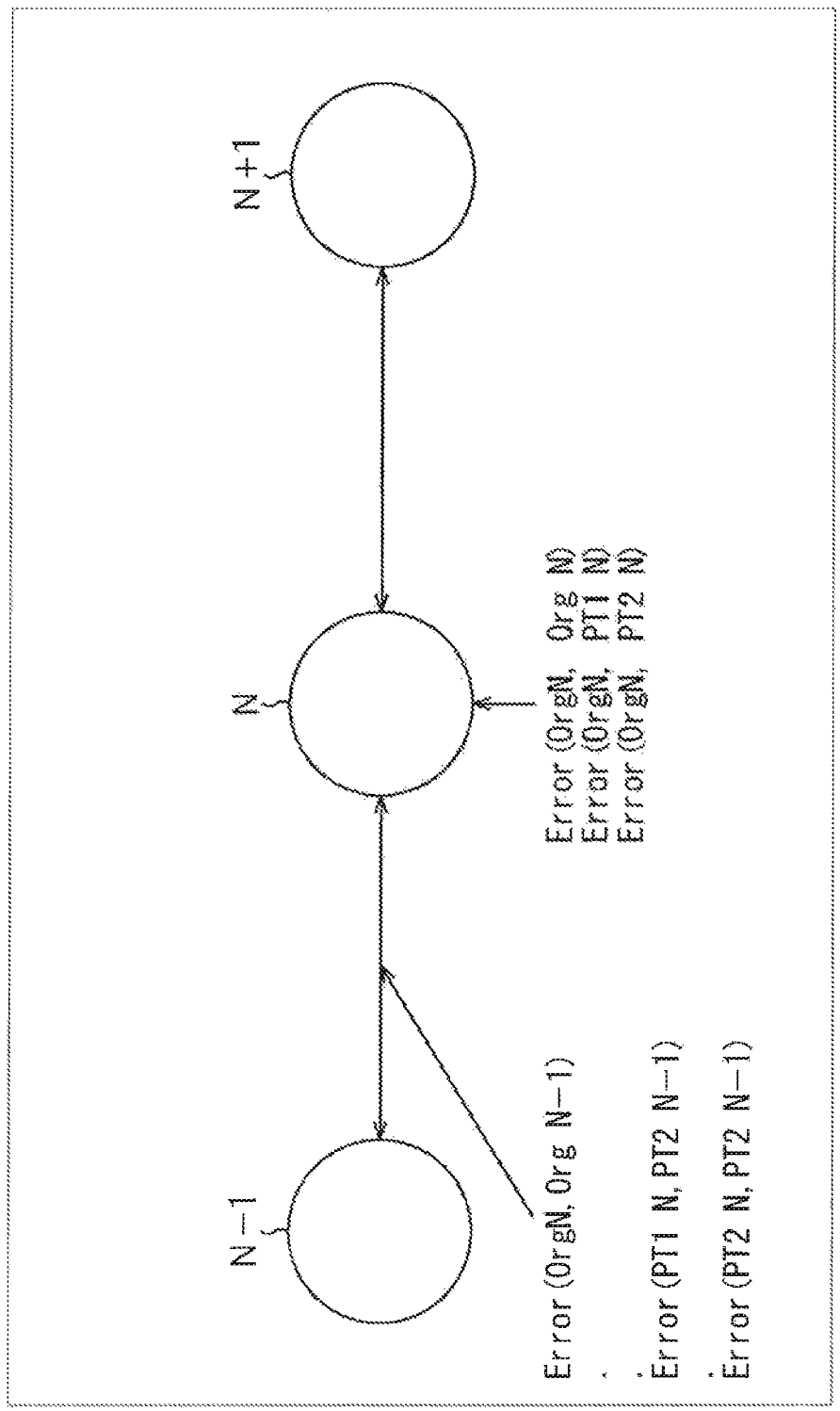
FIG. 14 is a diagram illustrated to describe a conversion process between frame images of a moving image file, which can be processed as a graph optimization problem.

In other words, the evaluation value E, which is set according to the arrangement of frame image in the moving image file generated in various patterns, may be processed as a graph optimization problem obtained from the node difference, that is, the difference with the original image for each image that may be an option of the frame images that constitute the moving image file and the edge difference between the preceding and succeeding images that may be an option that can be arranged in time series, as shown in FIG. 14. In FIG. 14, circle (N−1), circle (N), and circle (N+1) each indicates a node, and arrows indicate an edge. Error_n(Org(N),Org(N)) indicates a node difference between the original frame image Org(N) and the frame image Org(N). Error_n(Org(N),P1(N)) indicates a node difference between the original frame image Org(N) and the converted image P1(N). Error_n(Org(N),P2(N)) indicates a node difference between the original frame image Org(N) and the converted image P2(N). Error(Org(N),Org(N−1)), Error(P1(N),P2(N−1)), Error_e(P2(N),P2(N−1)), and values among them indicate an edge difference.

Thus, in step S126, the converted moving image file selection unit 120 selects a converted moving image file composed of patterns arranged in time series of the frame image having the lowest evaluation value E, that is, the smallest evaluation value or the converted image. The converted moving image file selection unit 120 allows the storage unit 93 to store the converted moving image file composed of frame images arranged in time series or the converted moving image file composed of converted images, according to the selected pattern.

In step S127, the imaging direction coloring unit 112 extracts imaging direction information of the frame image having the smallest evaluation value E or each frame image that constitute the converted moving image file composed of patterns arranged in time series of the converted image, selected by the converted moving image file selection unit 120. The imaging direction coloring unit 112 determines color arrangement of the route L shown in FIG. 9 and generates route display information of the route L.

In step S128, the reproduction management unit 94 controls the communication unit 91 to transmit the newly generated route display information to the reproduction terminal 12 via the network 13.

In step S129, the reproduction management unit 94 determines whether information instructing to terminate the operation is received through the communication unit 91. If it is determined that an instruction to terminate the operation is not issued, the process returns to step S121 and the subsequent steps are repeated. In step S121, if it is determined that the correction scale information is not transmitted, the process in steps S122 to S128 is skipped. In step S129, if it is determined that an instruction to terminate the operation is issued, the process ends.

On the other hand, in the reproduction terminal 12, in step S103, the control unit 71 controls the communication unit 74 to obtain the route display information transmitted.

In step S104, the control unit 71 controls the display unit 72 to process coloring on the route L shown in FIG. 9 and to display the processed route as a new route L on the display unit 72 based on the received route display information.

In step S105, the control unit 71 determines whether the termination is instructed by the operation of the operation unit 73. If it is determined that the termination is not instructed, the process returns to step S101 and the subsequent steps are repeated. Then, in step S105, if it is determined that the termination is instructed, the process ends.

This process allows the frame image that constitutes the moving image file to be converted into a converted moving image file with a pattern having the smallest evaluation value E among the combined converted images constituted by performing a plurality types of angle of view conversion and rotation conversion by operating the correction knob M. Such a process makes it possible to recognize a difference between the moving image file composed of an image that is similar to the original image and is difficult to be collapsed but that is difficult to view due to frequent change in imaging directions for each frame image, so-called moving image file that is easy to induce motion sickness, and the moving image file composed of an image that is significantly different from the original image and is easy to be collapsed but that is relatively easy to view due to infrequent change in imaging directions for each frame image, so-called moving image file that is difficult to induce motion sickness, from a change in color assigned on the route L in response to the operation of the correction knob M.

Figure 15:
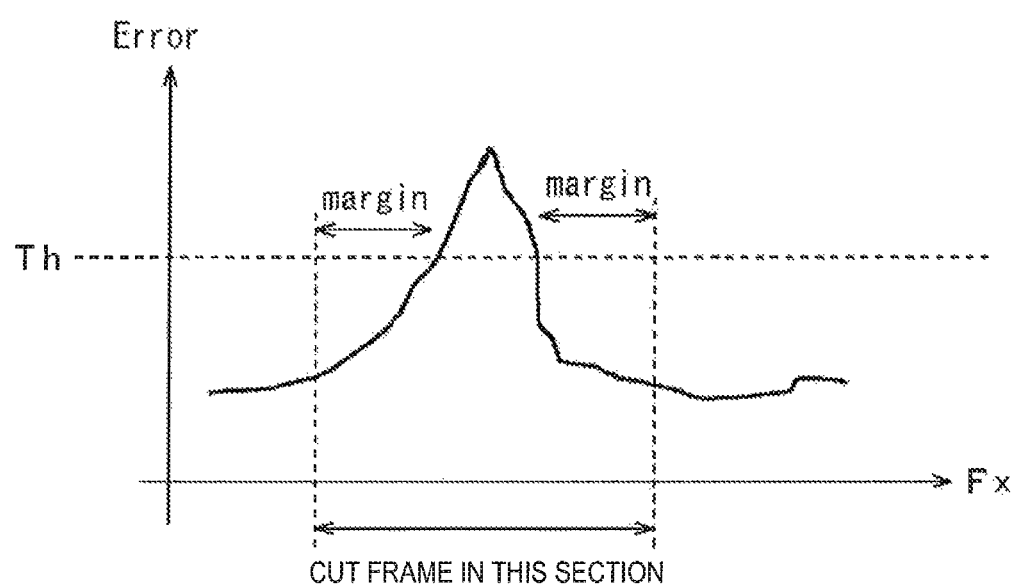
FIG. 15 is a diagram illustrated to describe an example of cutting off the region where an image is collapsed due to a converted image.

When the image collapse occurs in the converted image as described above, a difference between the preceding and succeeding images in time series is expected to be larger. Thus, for the frame image having the lowest evaluation value E, the frame image that constitutes the moving image file selected based on the arrangement of the time series of the converted images, or the frame image that exists in a section in which the edge difference is greater than a predetermined threshold Th and a section indicated by margin before and after the section described above, for example as shown in FIG. 15, using the edge difference information of the converted image, it may be possible to prevent a collapsed section from being viewed by setting the frame images in a section in which the reproduction is not performed, that is, a cut section. This allows a collapsed image to be prevented from being viewed while selecting a moving image file by color on the route L regarded as optimal by the user, and thus a converted moving image file that is easier to view can be generated.

Reproduction Process

Figure 16:
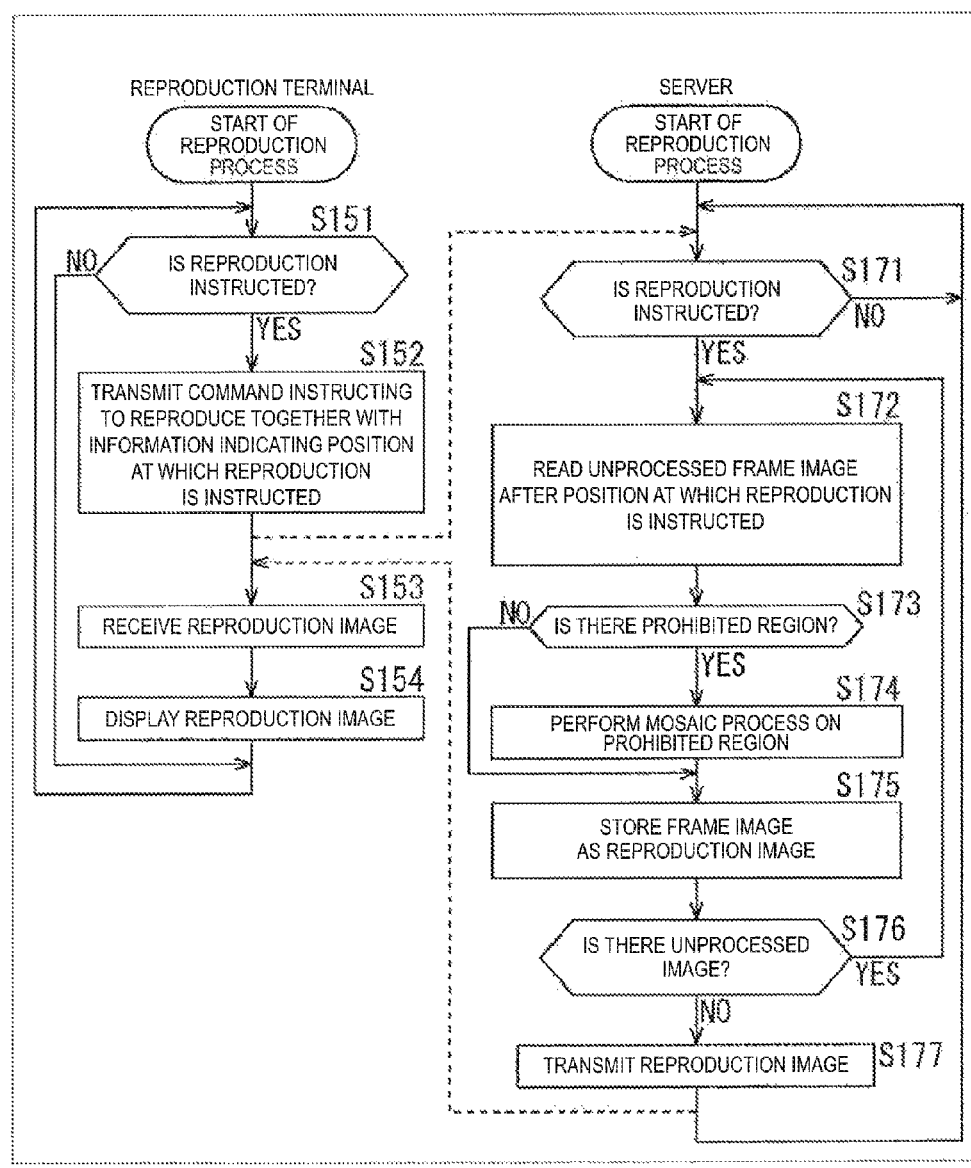
FIG. 16 is a flowchart illustrated to describe a reproduction process.

The reproduction process will be described with reference to the flowchart of FIG. 16. The reproduction process is based on the assumption that the display image selection image as shown in FIG. 9 is displayed. The moving image file that is instructed to be reproduced is the converted moving image file generated by minimizing the evaluation value E by the above-described route correction process.

In step S151, the control unit 71 determines whether the moving image file is instructed to be reproduced by a predetermined operation by controlling the operation unit 73. A similar process is repeated until the reproduction is instructed. In step S151, for example, if the position P on the route L in the My Map shown in FIG. 9 is selected by a pointer (not shown) and it is determined that the reproduction is instructed, the process proceeds to step S152.

In step S152, the control unit 71 controls the communication unit 74 to transmit position information on the map corresponding to the selected position P and a command for instructing to reproduce the moving image file located in the position to the server 14.

In step S171, the reproduction management unit 94 of the server 14 controls the communication unit 91 to determine whether the reproduction is instructed, and repeats a similar process until the reproduction is instructed. In step S171, for example, if it is determined that information for instructing to reproduce is transmitted by the process in step S152, it is assumed that the reproduction is instructed, and then the process proceeds to step S172.

In step S172, the reproduction management unit 94 searches an unprocessed frame image among information of the corresponding moving image files (converted moving image files) based on the position information and time information in which the reproduction is instructed, and reads the unprocessed frame image as an image to be processed.

In step S173, the prohibition editing unit 121 extracts the read image to be processed and determines whether a prohibited region exists in the image from the assigned image-captured time, imaging position, imaging direction, or the like. In other words, more specifically, the prohibition editing unit 121 determines whether, for example, as a prohibited region, a region containing information such as personally identifiable information, a region in which military secret or the like specified based on position information is seemed to be captured, or a region that may have a problem if disclosure is made at a predetermined time exists in the image captured by the glasses-mounted camera 11.

If it is determined that there is a prohibited region in step S173, the prohibition editing unit 121, in step S174, makes a prohibited region of an image to be processed incapable of viewing by performing a mosaic process or blackening process in the image. If it is determined that there is not a prohibited region in step S173, the process in step S174 is skipped.

In step S175, the reproduction management unit 91 stores the read image to be processed or the target image to be processed that is edited as prohibited by the prohibition editing unit 121 in the moving image file as a reproduction image.

In step S176, the reproduction management unit 94 determines whether an unprocessed frame image exists in the moving image file. If it is determined that there is an unprocessed frame image, the process returns to step S172 and the subsequent steps are repeated. If all the frame images included in the moving image file corresponding to the time and position at which the reproduction is instructed are target images to be processed that are used to determine whether there is a prohibited region, the process proceeds to step S177.

In step S177, the reproduction management unit 94 controls the communication unit 91 to transmit the moving image file to which the reproduction is instructed to the reproduction terminal 12, and the process returns to step S171.

On the other hand, in the reproduction terminal 12, in step S153, the control unit 71 controls the communication unit 74 to receive the moving image file transmitted from the server 14 via the network 13.

In step S154, the control unit 71 sequentially reproduces the moving image files received through the communication unit 74 in frame image units and displays the moving image files on the display unit 72.

In the above, although an example in which the reproduction is instructed by selecting the position P on the route L shown on the My Map of FIG. 9 using the operation unit 73 is described, the reproduction may be similarly instructed by selecting any of the images P11 to P16 and P21 to P26 in the XrossMediaBar.

The process described above allows the user to specify a reproduction position on the moving image file that is captured with the glasses-mounted camera 11 and is displayed as the route L in the form of display image selection image as shown in FIG. 9, called My Map, according to the position and object on the map or the time at which the object is captured. The route L shown in FIG. 9 is displayed as an image obtained by adding different colors to each imaging direction of the flame image included in the moving image file captured on the route, and thus a change in the imaging directions, that is, a degree of blur between frame images in the moving image file can be visually recognized at a glance. The operation of the correction knob M allows an instruction of reproduction while viewing color assigned on the route L by recognizing a difference between the moving image file composed of an image that is similar to the original image and is difficult to be collapsed but that is difficult to view due to frequent change in imaging directions for each frame image, so-called moving image file that is easy to induce motion sickness, and the moving image file composed of an image that is significantly different from the original image and is easy to be collapsed but that is relatively easy to view due to infrequent change in imaging directions for each frame image, so-called moving image file that is difficult to induce motion sickness.

In the above, although an example in which the glasses-mounted camera 11 is used in the image capturing process is described, an image with less blur can be generated by performing a similar process on an image captured with a video camera or other imaging devices as long as the imaging devices are equipped with a function of capturing a moving image. In the above, although an example in which the server 14 on the network 13 performs various types of processing is described, the function of the server 14 may be implemented by a cloud computing or other approaches as long as they are equipped with the same function as the server 14.

Incidentally, the above series of processes can, for example, be executed by hardware, or can be executed by software. In the case where the series of processes is executed by software, a program configuring this software is installed in a computer included in dedicated hardware, or a general-purpose personal computer which can execute various functions when various programs are installed, etc., from a recording medium.

FIG. 17 shows an example configuration of a general-purpose personal computer. The computer includes a central processing unit (CPU) 1001. An input/output interface 1005 is connected to the CPU 1001 through a bus 1004. A read only memory (ROM) 1002 and a random access memory (RAM) 1003 are connected to the bus 1004.

An input unit 1006 including an input device, such as a keyboard, a mouse, etc., which is used by the user to input an operation command, an output unit 1007 which outputs a process operation screen or an image of a process result to a display device, a storage unit 1008 including a hard disk drive etc. which stores a program or various items of data, and a communication unit 1009 including a local area network (LAN) adaptor etc., which performs a communication process through a network typified by the Internet, are connected to the input/output interface 1005. Also, connected is a drive 1010 which reads and writes data from and to a removable medium 1011, such as a magnetic disk (including a flexible disk), an optical disk (including a compact disc-read only memory (CD-ROM) and a digital versatile disc (DVD)), an magneto-optical disk (including an mini disc (MD)), or a semiconductor memory, etc.

The CPU 1001 executes various processes according to a program stored in the ROM 1002 or a program which is read from the removable medium 1011, such as a magnetic disk, an optical disk, a magneto-optical disk, or a semiconductor memory, etc., is installed in the storage unit 1008, and is loaded from the storage unit 1008 to the RAM 1003. The RAM 1003 also stores data which is required when the CPU 1001 executes various processes, etc., as appropriate.

In the computer configured as described above, the CPU 1001 loads a program that is stored, for example, in the storage unit 1008 onto the RAM 1003 via the input/output interface 1005 and the bus 1004, and executes the program. Thus, the above-described series of processing is performed.

Programs to be executed by the computer (the CPU 1001) are provided being recorded in the removable medium 1011 which is a packaged medium or the like. Also, programs may be provided via a wired or wireless transmission medium, such as a local area network, the Internet or digital satellite broadcasting.

In the computer, by inserting the removable medium 1011 into the drive 1010, the program can be installed in the storage unit 1008 via the input/output interface 1005. Further, the program can be received by the communication unit 1009 via a wired or wireless transmission medium and installed in the storage unit 1008. Moreover, the program can be installed in advance in the ROM 1002 or the storage unit 1008.

It should be noted that the program executed by a computer might be a program that is processed in time series according to the sequence described in this specification or a program that is processed in parallel or at necessary timing such as upon calling.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the present technology is not limited to the embodiments described above, and various changes and modifications may be made without departing from the scope of the present technology.

For example, the present technology can adopt a configuration of cloud computing which processes by allocating and connecting one function by a plurality of apparatuses through a network.

Further, each step described by the above-mentioned flowcharts can be executed by one apparatus or by allocating a plurality of apparatuses.

In addition, in the case where a plurality of processes are included in one step, the plurality of processes included in this one step can be executed by one apparatus or by sharing a plurality of apparatuses.

Additionally, the present technology may also be configured as below.

(1)

An image processing device including:

an acquisition unit configured to acquire information on an imaging position and an imaging direction in units of frame images that constitute a moving image obtained through capturing by an imaging unit;

a converted image generation unit configured to generate a plurality of converted images having different imaging directions for each frame image that constitutes the moving image based on the frame image itself and preceding and succeeding frame images of the frame image;

an evaluation value calculation unit configured to calculate an evaluation value for each converted moving image constituted by combining the converted image and the original frame image, the evaluation value being used to evaluate a blur between the converted images or between the original frame images; and a selection unit configured to select a converted moving image with less blur based on an evaluation value calculated by the evaluation value calculation unit.

(2)

The image processing device according to (1), further including:

a node difference calculation unit configured to calculate a difference between the converted image generated by the converted image generation unit and the original frame image as a node difference; and an edge difference calculation unit configured to calculate a difference in a time series including the converted image generated by the converted image generation unit and the original frame image as an edge difference, wherein the evaluation value calculation unit calculates an evaluation value used to evaluate a blur for each of converted moving images based on each of a sum of the edge difference and a sum of the node difference between the converted images or the original frame images included in the converted moving image constituted by combining the converted image and the original image.

(3)

The image processing device according to (2), wherein the evaluation value calculation unit calculates an evaluation value used to evaluate a blur for each of the converted moving images by applying a weight to each of the sum of the edge difference and the sum of the node difference between the converted images or the original frame images included in the converted moving image constituted by combination of the converted image and the original image and by calculating a sum of the weighted values.

(4)

The image processing device according to (3), further including:

a weight input unit configured to input a weight to be applied to the sum of the edge difference and the sum of the node difference, a sum of the weight applied to each of the sum of the edge difference and the sum of the node difference being a value of 1, wherein the evaluation value calculation unit calculates an evaluation value used to evaluate a blur for each of the converted moving images by applying a weight inputted by the weight input unit to each of the sum of the edge difference and the sum of the node difference between the converted images or the original frame images included in the converted moving image constituted by combination of the converted image and the original image and by calculating a sum of the weighted values.

(5)

The image processing device according to (1), wherein the storage unit also stores information on an imaging direction being changed in accordance with the original frame image by having a plurality of predetermined angles of view and by rotating to a plurality of angles in association with the converted image when the converted image is generated by the converted image generation unit, and wherein the image processing device further includes a display image generation unit configured to generate a display image that displays a route on a map based on the converted moving image or the imaging position information of the frame image of the moving image and displays by applying a different color to each imaging direction on the route based on the imaging direction information.

(6)

The image processing device according to (5), further including:

a specifying unit configured to specify a position on the route displayed on the map on the display image; and a reproduction unit configured to reproduce the converted moving image that constitutes the route or the moving image from a frame image including information on an imaging position corresponding to a position specified by the specifying unit.

(7)

The image processing device according to (1), wherein the converted image generation unit generates a converted image by converting each frame image that constitutes a moving image stored in the storage unit into a plurality of images having the different imaging directions by having a plurality of predetermined angles of view and by rotating to a plurality of angles by a technique including an angle of view shift, homography transformation, and viewpoint composition, using the frame image itself and preceding and succeeding frame images of the frame image.

(8)

The image processing device according to (1), wherein the converted image generation unit generates a plurality of higher-resolution converted images having the different imaging directions for each frame image that constitutes a moving image stored in the storage unit by using a pixel generated by a phase shift equal to or smaller than a pixel based on the frame image itself and preceding and succeeding frame images of the frame image.

(9)

The image processing device according to any one of (1) to (8), further including:

the imaging unit configured to capture the moving image, wherein the acquisition unit stores the information on the imaging position and the imaging direction of the frame image in association with each of the frame images.

(10)

An image processing method including:

acquiring information on an imaging position and an imaging direction in units of frame images that constitute a moving image obtained through capturing by an imaging unit;

generating a plurality of converted images having different imaging directions for each frame image that constitutes the moving image based on the frame image itself and preceding and succeeding frame images of the frame image;

calculating an evaluation value for each converted moving image constituted by combining the converted image and the original frame image, the evaluation value being used to evaluate a blur between the converted images or between the original frame images; and selecting a converted moving image with less blur based on a calculated evaluation value.

(11)

A program for causing a computer to execute processing including:

an acquisition step of acquiring information on an imaging position and an imaging direction in units of frame images that constitute a moving image obtained through capturing by an imaging unit;

a converted image generation step of generating a plurality of converted images having different imaging directions for each frame image that constitutes the moving image based on the frame image itself and preceding and succeeding frame images of the frame image;

an evaluation value calculation step of calculating an evaluation value for each converted moving image constituted by combining the converted image and the original frame image, the evaluation value being used to evaluate a blur between the converted images or between the original frame images; and a selection step of selecting a converted moving image with less blur based on an evaluation value calculated by processing of the evaluation value calculation step.

REFERENCE SIGNS 11, 11-1 to 11-N glasses-mounted camera
12, 12-1 to 12-M reproduction terminal
13 network
14 server
32 imaging unit
33 control unit
51 recording unit
52 GPS
53 RTC
54 earth's axis sensor
55 gyro sensor
56 controller
57 communication unit
71 control unit
72 display unit
73 operation unit
74 communication unit
75 display image storage unit
91 communication unit
92 recording unit 93 storage unit
94 reproduction management unit
101 indexing unit
111 My Map creation unit
112 imaging direction coloring unit
113 object recognition unit
114 map data storage unit
115 route editing unit
116 converted moving image file generation unit
117 node difference calculation unit
118 edge difference calculation unit
119 evaluation value calculation unit
120 converted moving image file selection unit
121 prohibition editing unit

The invention claimed is:

1. An image processing device comprising:
an acquisition unit configured to acquire information on an imaging position and an imaging direction in units of frame images that constitute a moving image obtained through capturing by an imaging unit;
a converted image generation unit configured to generate a plurality of converted images having different imaging directions for each frame image that constitutes the moving image based on the frame image itself and preceding and succeeding frame images of the frame image;
an evaluation value calculation unit configured to calculate an evaluation value for each converted moving image constituted by combining the converted image and the original frame image, the evaluation value being used to evaluate a blur between the converted images or between the original frame images; and
a selection unit configured to select a converted moving image with less blur based on an evaluation value calculated by the evaluation value calculation unit,
wherein the acquisition unit, the converted image generation unit, the evaluation value calculation unit, and the selection unit are each implemented via at least one processor.

2. The image processing device according to claim 1, further comprising:
a node difference calculation unit configured to calculate a difference between the converted image generated by the converted image generation unit and the original frame image as a node difference; and
an edge difference calculation unit configured to calculate a difference in a time series including the converted image generated by the converted image generation unit and the original frame image as an edge difference,
wherein the evaluation value calculation unit calculates an evaluation value used to evaluate a blur for each of converted moving images based on each of a sum of the edge difference and a sum of the node difference between the converted images or the original frame images included in the converted moving image constituted by combining the converted image and the original image, and
wherein the node difference calculation unit and the edge difference calculation unit are each implemented via at least one processor.

3. The image processing device according to claim 2,
wherein the evaluation value calculation unit is further configured to calculate an evaluation value used to evaluate a blur for each of the converted moving images by applying a weight to each of the sum of the edge difference and the sum of the node difference between the converted images or the original frame images included in the converted moving image constituted by combination of the converted image and the original image and by calculating a sum of the weighted values.

4. The image processing device according to claim 3, further comprising:
a weight input unit configured to input a weight to be applied to the sum of the edge difference and the sum of the node difference, a sum of the weight applied to each of the sum of the edge difference and the sum of the node difference being a value of 1,
wherein the evaluation value calculation unit calculates an evaluation value used to evaluate a blur for each of the converted moving images by applying a weight inputted by the weight input unit to each of the sum of the edge difference and the sum of the node difference between the converted images or the original frame images included in the converted moving image constituted by combination of the converted image and the original image and by calculating a sum of the weighted values, and
wherein the weight input unit is implemented via at least one processor.

5. The image processing device according to claim 1,
wherein the storage unit is further configured to store information on an imaging direction being changed in accordance with the original frame image by having a plurality of predetermined angles of view and by rotating to a plurality of angles in association with the converted image when the converted image is generated by the converted image generation unit,
wherein the image processing device further comprises a display image generation unit configured to generate a display image that displays a route on a map based on the converted moving image or the imaging position information of the frame image of the moving image and displays by applying a different color to each imaging direction on the route based on the imaging direction information, and
wherein the display image generation unit is implemented via at least one processor.

6. The image processing device according to claim 5, further comprising:
a specifying unit configured to specify a position on the route displayed on the map on the display image; and
a reproduction unit configured to reproduce the converted moving image that constitutes the route or the moving image from a frame image including information on an imaging position corresponding to a position specified by the specifying unit,
wherein the specifying unit and the reproduction unit are each implemented via at least one processor.

7. The image processing device according to claim 1,
wherein the converted image generation unit is further configured to generate a converted image by converting each frame image that constitutes a moving image stored in the storage unit into a plurality of images having the different imaging directions by having a plurality of predetermined angles of view and by rotating to a plurality of angles by a technique including an angle of view shift, homography transformation, and viewpoint composition, using the frame image itself and preceding and succeeding frame images of the frame image.

8. The image processing device according to claim 1,
wherein the converted image generation unit is further configured to generate a plurality of higher-resolution converted images having the different imaging directions for each frame image that constitutes a moving image stored in the storage unit by using a pixel generated by a phase shift equal to or smaller than a pixel based on the frame image itself and preceding and succeeding frame images of the frame image.

9. The image processing device according to claim 1, wherein the imaging unit is further configured to capture the moving image, and
wherein the acquisition unit is further configured to store the information on the imaging position and the imaging direction of the frame image in association with each of the frame images.

10. An image processing method, performed via at least one processor, the method comprising:
acquiring information on an imaging position and an imaging direction in units of frame images that constitute a moving image obtained through capturing by an imaging unit;
generating a plurality of converted images having different imaging directions for each frame image that constitutes the moving image based on the frame image itself and preceding and succeeding frame images of the frame image;
calculating an evaluation value for each converted moving image constituted by combining the converted image and the original frame image, the evaluation value being used to evaluate a blur between the converted images or between the original frame images; and
selecting a converted moving image with less blur based on a calculated evaluation value.

11. A non-transitory computer-readable medium having embodied thereon a program, which when executed by a computer, causes the computer to execute a method, the method comprising:
acquiring information on an imaging position and an imaging direction in units of frame images that constitute a moving image obtained through capturing by an imaging unit;
generating a plurality of converted images having different imaging directions for each frame image that constitutes the moving image based on the frame image itself and preceding and succeeding frame images of the frame image;
calculating an evaluation value for each converted moving image constituted by combining the converted image and the original frame image, the evaluation value being used to evaluate a blur between the converted images or between the original frame images; and
selecting a converted moving image with less blur based on an evaluation value calculated by processing of the evaluation value calculation step.

* * * * *